US011385406B2

(12) United States Patent
Dunphy et al.

(10) Patent No.: US 11,385,406 B2
(45) Date of Patent: Jul. 12, 2022

(54) OPTICAL SIGNAL ROUTING DEVICES AND SYSTEMS

(71) Applicant: Waymo LLC, Mountain View, CA (US)

(72) Inventors: James Dunphy, San Jose, CA (US); David Hutchison, Santa Clara, CA (US); Pierre-Yves Droz, Los Altos, CA (US); Yeh-Jiun Tung, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 24 days.

(21) Appl. No.: 16/667,833

(22) Filed: Oct. 29, 2019

(65) Prior Publication Data

US 2021/0124020 A1  Apr. 29, 2021

(51) Int. Cl.
*G02B 6/125* (2006.01)
*G01S 7/481* (2006.01)
*G02B 6/122* (2006.01)
*G02B 6/42* (2006.01)
*G01S 17/10* (2020.01)

(52) U.S. Cl.
CPC ............ *G02B 6/125* (2013.01); *G01S 7/4815* (2013.01); *G02B 6/1228* (2013.01); *G02B 6/4202* (2013.01); *G01S 17/10* (2013.01)

(58) Field of Classification Search
CPC .... G02B 6/125; G02B 6/1228; G02B 6/4815; G02B 6/4202; G01S 7/10; G01S 7/481
USPC ...................................... 385/31–32, 129–132
See application file for complete search history.

(56) References Cited

U.S. PATENT DOCUMENTS

| 8,190,030 | B2 | 5/2012 | Leclair et al. |
| 10,101,630 | B2 | 10/2018 | Watts et al. |
| 10,534,143 | B1 | 1/2020 | Droz et al. |
| 10,707,195 | B2 | 7/2020 | Last et al. |
| 2005/0094942 | A1 | 5/2005 | Feuer et al. |

(Continued)

FOREIGN PATENT DOCUMENTS

| JP | 2016103003 A | 6/2016 |
| WO | 2006128422 A1 | 12/2006 |
| WO | 2019066259 A1 | 4/2019 |

OTHER PUBLICATIONS

Search Report and Written Opinion for PCT/US2020/057392 dated Feb. 15, 2021.

*Primary Examiner* — Michael P Mooney
(74) *Attorney, Agent, or Firm* — McDonnell Boehnen Hulbert & Berghoff LLP

(57) ABSTRACT

One example LIDAR device comprises a substrate and a waveguide disposed on the substrate. A first section of the waveguide extends lengthwise on the substrate in a first direction. A second section of the waveguide extends lengthwise on the substrate in a second direction different than the first direction. A third section of the waveguide extends lengthwise on the substrate in a third direction different than the second direction. The second section extends lengthwise between the first section and the second section. The LIDAR device also comprises a light emitter configured to emit light. The waveguide is configured to guide the light inside the first section toward the second section, inside the second section toward the third section, and inside the third section away from the second section.

23 Claims, 12 Drawing Sheets

(56) References Cited

U.S. PATENT DOCUMENTS

| | | | |
|---|---|---|---|
| 2008/0138008 A1* | 6/2008 | Tolstikhin | G02B 6/1228 |
| | | | 385/14 |
| 2013/0321096 A1 | 12/2013 | Fahmi et al. | |
| 2018/0067273 A1 | 3/2018 | Geng et al. | |
| 2018/0156971 A1* | 6/2018 | Droz | G02B 27/0994 |
| 2019/0072649 A1 | 3/2019 | Droz et al. | |

* cited by examiner

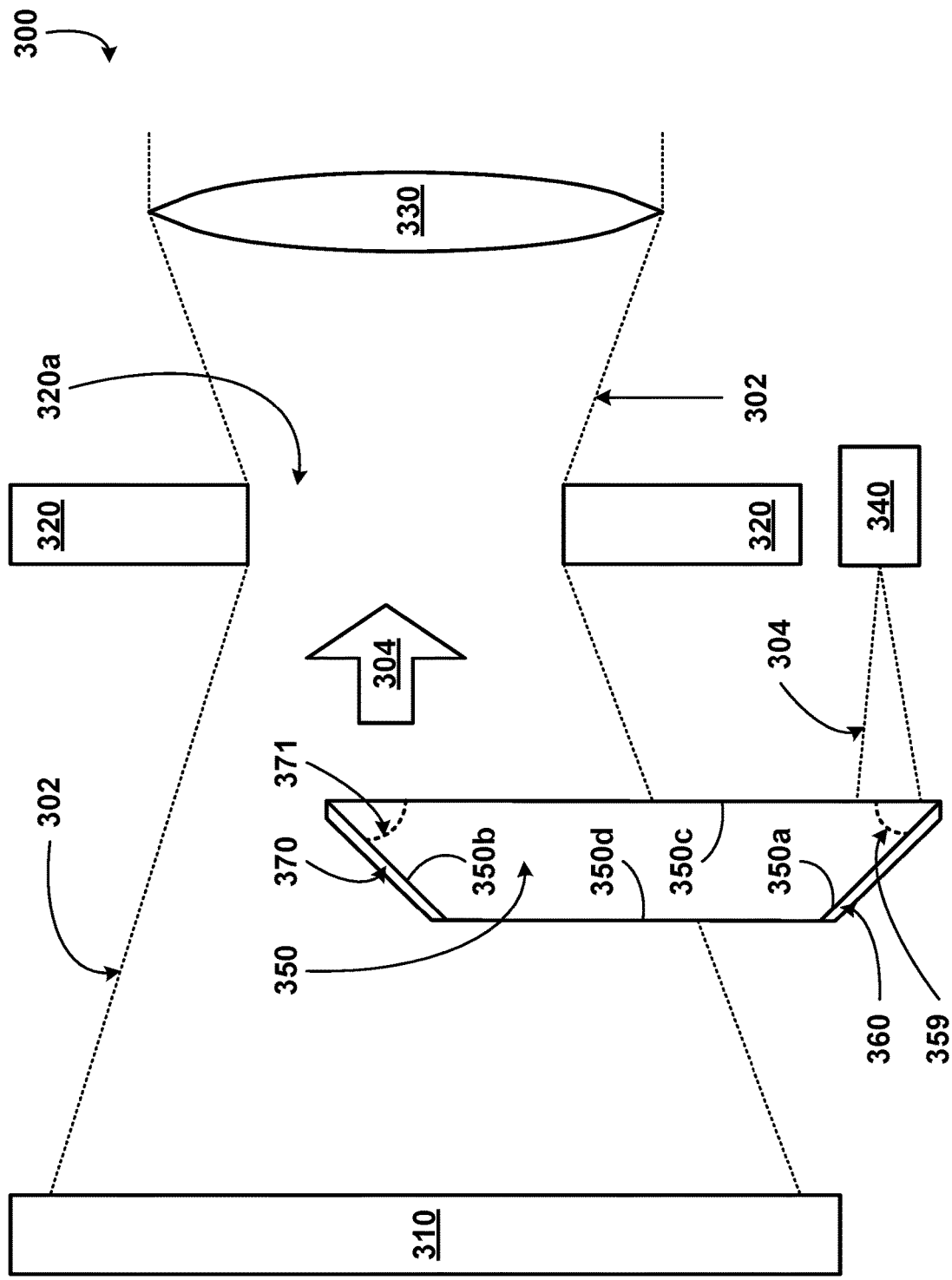

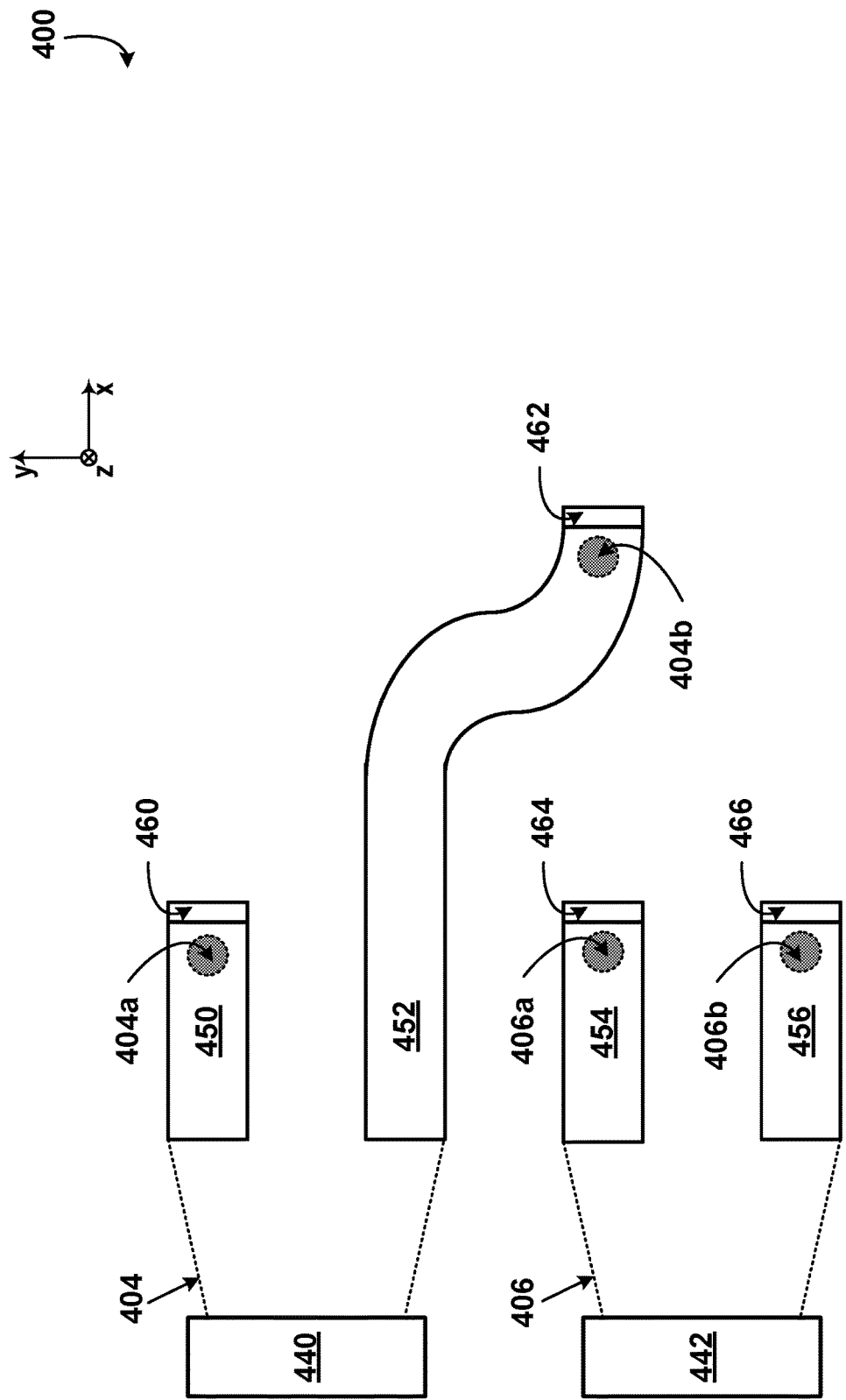

OPTICAL SIGNAL ROUTING DEVICES AND SYSTEMS

BACKGROUND

Unless otherwise indicated herein, the materials described in this section are not prior art to the claims in this application and are not admitted to be prior art by inclusion in this section.

Optical waveguides can be used in a variety of systems, such as medical devices, manufacturing systems, and remote sensing devices (e.g., LIDARs, etc.), among other examples. In general, an optical waveguide is a device that defines an optical path for guiding an optical signal from one spatial position (where the signal enters the waveguide) to another spatial position (where the signal exits the waveguide). In one example, an optical waveguide may include an optical material having a higher refractive index relative to its surrounding medium. Due to the difference between the refractive indexes, light propagating inside the optical material (or portions thereof) may reflect at one or more walls of the optical material back into the optical material (e.g., total internal reflection (TIR)) and then continue propagating inside the optical material. Thus, depending on a shape and/or other physical properties of the optical material, the optical waveguide may define a specific optical path for optical signals guided therein.

SUMMARY

In one example, a light detection and ranging (LIDAR) device comprises a substrate and a waveguide disposed on the substrate. A first section of the waveguide extends lengthwise on the substrate in a first direction. A second section of the waveguide extends lengthwise on the substrate in a second direction different than the first direction. A third section of the waveguide extends lengthwise on the substrate in a third direction different than the second direction. The second section extends lengthwise between the first section and the second section. The LIDAR device also comprises a light emitter configured to emit light. The waveguide is configured to guide the light inside the first section toward the second section, inside the second section toward the third section, and inside the third section away from the second section.

In another example, a light detection and ranging (LIDAR) device comprises a light emitter configured to emit a light signal. The LIDAR device is configured to transmit a plurality of light beams in a relative spatial arrangement. The LIDAR device also comprises a first waveguide configured to receive a first portion of the light signal and to transmit the first portion out of the first waveguide at a first transmit location as a first light beam of the plurality of light beams. A first section of the first waveguide extends lengthwise in a first direction. A second section of the first waveguide extends lengthwise in a second direction different than the first direction. A third section of the third waveguide extends lengthwise in a third direction different than the second direction. The LIDAR device also comprises a second waveguide configured to receive a second portion of the light signal and to transmit the second portion out of the second waveguide at a second transmit location as a second light beam of the plurality of light beams.

In yet another example, a method involves a light emitter emitting light into a waveguide. The method also involves guiding, inside a first section of the waveguide, the light in a first direction toward a second section of the waveguide. The first section extends lengthwise in a first direction. The method also involves guiding, inside the second section, the light in a second direction different than the first direction toward a third section of the waveguide. The second section extends lengthwise in the second direction. The method also involves guiding, inside the third section, the light in a third direction different than the second direction. The third section extends lengthwise in the third direction.

In still another example, a system comprises means for a light emitter emitting light into a waveguide. The system also comprises means for guiding, inside a first section of the waveguide, the light in a first direction toward a second section of the waveguide. The first section extends lengthwise in a first direction. The system also comprises means for guiding, inside the second section, the light in a second direction different than the first direction toward a third section of the waveguide. The second section extends lengthwise in the second direction. The system also comprises means for guiding, inside the third section, the light in a third direction different than the second direction. The third section extends lengthwise in the third direction.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3B illustrates a cross-section view of the system of FIG. 3A.

FIG. 4A illustrates a first cross-section view of a system that includes a waveguide assembly, according to example embodiments.

DETAILED DESCRIPTION

Figure 1A:
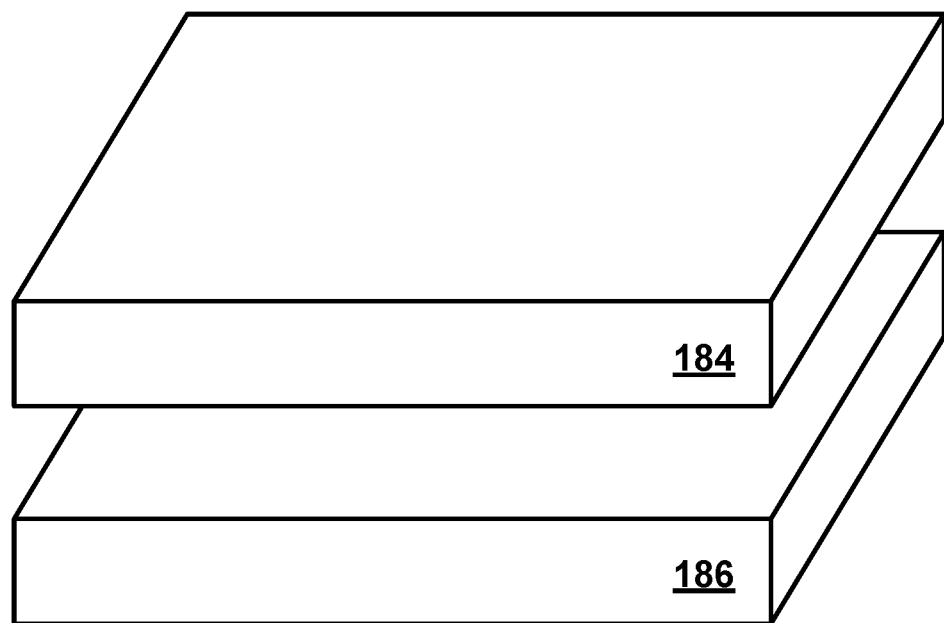
FIG. 1A illustrates an optical system, according to example embodiments.

Any example embodiment or feature described herein is not necessarily to be construed as preferred or advantageous over other embodiments or features. The example embodiments described herein are not meant to be limiting. It will be readily understood that certain aspects of the disclosed implementations can be arranged and combined in a wide variety of different configurations. Furthermore, the particular arrangements shown in the figures should not be viewed as limiting. It should be understood that other implementations might include more or less of each element shown in a given figure. In addition, some of the illustrated elements may be combined or omitted. Similarly, an example implementation may include elements that are not illustrated in the figures.

I. OVERVIEW

Some example optical systems disclosed herein can be employed for routing one or more optical signals (e.g., signal channels) in one or more optical paths. One example system includes a waveguide disposed on a substrate to define an optical path on the substrate for routing a light signal from an input location to an output location on the substrate. In various examples, the optical path may be configured to account for various design and physical considerations, such as space limitations on the substrate (e.g., other components may be mounted on the substrate), the input and output locations, and optical properties of the waveguide and the light signal (e.g., the critical angle of incidence required for TIR of the light signal inside the waveguide), among other considerations.

In one example, the waveguide extends lengthwise from a first end to a second end opposite the first end; and extends widthwise from a first wall to a second wall opposite the first wall. Additionally, the waveguide includes a first section extending lengthwise in a first direction and a second section extending lengthwise in a second direction different than the first direction. For instance, the first section may guide the light signal toward the second section, and the second section may then guide the light signal away from the first section. In some examples, the waveguide may include more sections, where each section extends lengthwise in a different direction than one or more other sections adjacent thereto.

Thus, with this arrangement, the waveguide can be shaped to define at least part of the optical path from the input location to the output location, while accounting for space limitations on the substrate. For example, other components (e.g., other waveguides, light emitters, circuitry, etc.) can be mounted between the input location and the output location without physically intersecting with the optical path defined by the waveguide.

In some examples, the first direction of the first section may be offset from the second direction of the second section by a relatively large offset angle (e.g., relative to the critical angle associated with TIR, etc.). In one embodiment, the first direction and the second direction may be perpendicular or nearly perpendicular to one another (e.g., offset angle between 80 degrees and 100 degrees, etc.). Other offset angles are possible.

To facilitate this, some examples herein include optical waveguide configurations that account for and/or mitigate potential signal leakage associated with changes to a guiding direction of a waveguide.

Other aspects, features, implementations, configurations, arrangements, and advantages are possible.

II. EXAMPLE SYSTEMS AND DEVICES

FIG. 1A illustrates an optical system 100, according to example embodiments. As shown, system 100 includes a plurality of substrates 184, 186 in an overlapping arrangement. It is noted that system 100 is shown to include only two overlapping substrates 184 and 186 for convenience in description. However, in alternate embodiments, system 100 could alternatively include fewer or more substrates.

In the embodiment shown, overlapping sides (e.g., walls) of substrates 184 and 186 are arranged substantially parallel to one another. In alternate embodiments however, a given substrate could instead be tilted at an offset angle relative to an adjacent substrate in the overlapping arrangement of substrates.

In some examples, the plurality of substrates of system 100 may be physically coupled to one another such that adjacent substrates are separated by at least a given separation distance. For example, system 100 may also include one or more spacing structures (not shown), such as ball bearings, optical fibers, or any other type of solid spacing structure, disposed between substrates 184 and 186 to physically separate the two substrates from one another by at least the given separation distance. The given separation distance may be any distance depending on various applications of system 100. In one embodiment, the given separation distance may be between 1 millimeter and 100 millimeters. Other separation distances are possible.

Substrates 184, 186 may include any substrate suitable for supporting one or more signal routing structures (not shown in FIG. 1A) and/or other components of system 100. In one embodiment, overlapping and/or parallel sides of substrates 184, 186 may be configured as mounting surfaces on which optical waveguides (not shown in FIG. 1A) and/or other components of system 100 are mounted. In this embodiment, the components disposed on a given mounting surface of a given substrate may correspond to a respective layer in a multi-layer assembly of components in system 100.

In some embodiments, substrates 184 and/or 186 are formed from or include a transparent or partially transparent material (e.g., glass slide, cover glass, plastic film, etc.), which is at least partially transparent to one or more wavelengths of light. For example, where system 100 is employed for routing optical signals in the infrared wavelength range, the material used may be at least partially transparent to infrared wavelengths. In various examples, other wavelengths are possible in addition to or instead of infrared wavelengths.

In alternate embodiments, substrates 184 and/or 186 could instead be formed from or include an opaque material (e.g., a semiconductor substrate such as silicon or gallium arsenide, a printed circuit board (PCB) substrate, or any other type of opaque substrate).

Figure 1B:
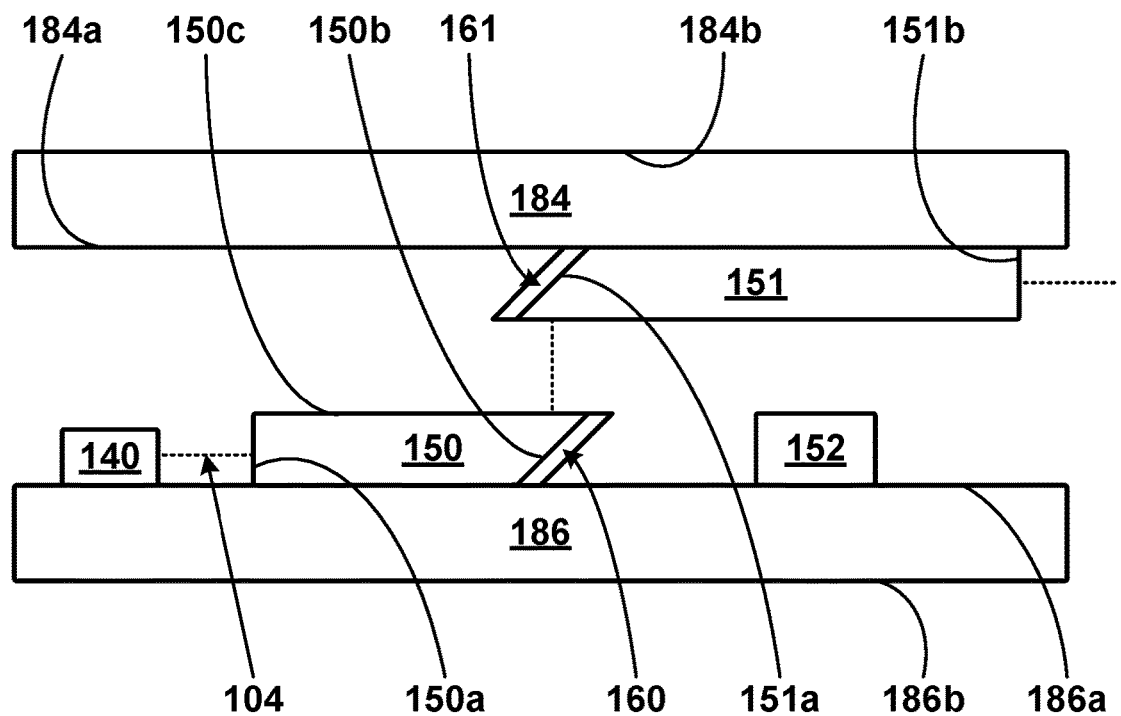
FIG. 1B illustrates a cross-section view of the system of FIG. 1A.

FIG. 1B illustrates a cross-section view of system 100. For purposes of illustration, FIG. 1B shows x-y-z axes, where the y-axis extends through the page. As shown, system 100 also includes light emitter 140, waveguides 150, 151, 152, and mirrors 160, 161.

Light emitter 140 may include a laser diode, fiber laser, a light-emitting diode, a laser bar, a nanostack diode bar, a filament, a LIDAR transmitter, or any other light source. In some embodiments, emitter 140 may be implemented as a pulsed laser (as opposed to a continuous wave laser), allowing for increased peak power while maintaining an equivalent continuous power output. Other implementations are possible.

Waveguides 150, 151, 152 can be formed from a glass substrate (e.g., glass plate, etc.), a photoresist material (e.g., SU-8, etc.), or any other material at least partially transparent to one or more wavelengths of emitted light 104. As shown in FIG. 1B, one or more components (e.g., waveguide 151) are disposed on a first surface (e.g., side 184a) of substrate 184 as a first layer of component, and one or more other components (e.g., waveguides 150, 152, emitter 140) are disposed on a second surface (e.g., side 186a of substrate 186) as a second layer of optical components in the multi-layer system 100. Although not shown, in some examples, system 100 may alternatively or additionally include one or more layers of components mounted on other surfaces of substrates 184, 186 (e.g., sides 184*b*, 186*b*, etc.).

In some embodiments, waveguides 150, 151, 152 can be disposed onto the respective surfaces of substrates 184, 186 shown via optical lithography. For example, a photosensitive material (e.g., photoresist, etc.) can be disposed on substrates 184, 186, exposed to patterned light, and then selectively etched to form waveguides 150, 151, 152 having the respective shapes and positions shown in FIG. 1B. In this example, the photosensitive material may be sensitive to the patterned light prior to etching and fixing the pattern (e.g., and not sensitive to guided light 104 after the waveguides 150, 151, 152 are etched, etc.). To that end, the photosensitive material may include SU-8 or any other photosensitive material. In some examples, the photosensitive material could be patterned to form other optical elements, such as input couplers, output couplers, and/or other optical elements in addition to or instead of waveguides 150, 151, 152. In some implementations, waveguides 150, 151, 152 may be configured as multi-mode waveguides to facilitate total internal reflection of light signals guided therein. Other implementations are possible as well.

In the example shown, system 100 is shown to include mirrors 160, 161. Mirrors 160, 161 may be formed from any reflective material that has reflectivity characteristics suitable for reflecting (at least partially) wavelengths of light 104. To that end, a non-exhaustive list of example reflective materials includes gold, aluminum, other metal or metal oxide, synthetic polymers, hybrid pigments (e.g., fibrous clays and dyes), among other examples. Alternatively or additionally, in some implementations, mirrors 160, 161 may be formed from one or more dielectric materials. In one implementation, mirror 160 (and/or 161) may be configured as a dielectric mirror (e.g., Bragg mirror, etc.). For instance, the dielectric mirror may be formed from multiple layers of dielectric material. Each dielectric layer may have respective material type and/or thickness characteristics suitable for causing the dielectric mirror to reflect one or more wavelengths of light signal 104 incident on the dielectric mirror. Other implementations are possible.

In alternative examples, system 100 could be implemented without mirror 160 and/or 161. In a first example, waveguide 150 may be configured to internally reflect light signal 104 at edge 150*b* (e.g., via total internal reflection (TIR)) without the presence of mirror 160. In this example, edge 150*b* can be configured as a TIR mirror by selecting a tilting angle between edge 150*b* and side 150*c* such that guided light 104 is incident on edge 150*b* from one or more angles-of-incidence that would cause light 104 to be internally reflected at edge 150*b* toward waveguide 151. Similarly, in a second example, edge 151*a* can be configured as a TIR mirror (e.g., edge 151*a* could be tilted at a suitable tilting angle for TIR of light signal 104*a* incident thereon without the presence of mirror 161).

In the example arrangement shown in FIG. 1B, emitter 140 is aligned to emit a first light signal 104 into an "input section" of waveguide 150. The input section of waveguide 150 corresponds to a section of waveguide 150 (e.g., side 150*a*) through which light signal 104 enters the waveguide. Further, in this example, waveguide 150 is disposed on substrate 186 and shaped to define a first optical path inside waveguide 150 for guiding light signal 104 (in the x-direction) toward side 150*b* of waveguide 150. As shown, side 150*b* is tilted toward substrate 184, and mirror 160 is disposed on the tilted edge defined at side 150*b*. In this example, mirror 160 may be configured as an "output mirror" of waveguide 150 that reflects light signal 104 out of waveguide 150 and toward substrate 184 (as illustrated by the dotted lines). The section of waveguide 150 through which light signal 104 exits the waveguide may be referred to herein as an "output section" of waveguide 150.

As shown, an angle between side 150*c* and the tilted edge of side 150*b* is an acute angle. In one embodiment, the acute tilting angle of tilted edge 150*b* is 45 degrees. However, other tilting angles are possible as well.

As illustrated by the dotted lines in FIG. 1B, waveguide 151 receives light signal 104 at an "input section" of waveguide 151 aligned with the output section of waveguide 150. In the example shown, the input section of waveguide 151 may correspond to a section of waveguide 151 that overlaps the output section (from which light signal 104 exits waveguide 150). In alternate examples however, the input section of waveguide 151 does not necessarily overlap waveguide 150. For instance, waveguide 150 may be configured to transmit light signal 104 in a different direction than the z-direction illustrated in FIG. 1B. In this instance, the input section of waveguide 151 may be aligned to intercept light signal 104 from waveguide 150 at a different location (e.g., depending on the location of the output section and the direction at which light signal 104 exits waveguide 150).

In the example shown, waveguide 151 is disposed on substrate 184 and shaped to define a second optical path (in the x-direction) on substrate 184. Further, as shown, waveguide 151 includes a tilted edge 151*a* (on which mirror 161 is disposed) at or near the input section of waveguide 151. Thus, mirror 161 may be configured as an input mirror of waveguide 151, which reflects light signal 104 (or portions thereof) incident on mirror 161 back into waveguide 151 and toward an output section of waveguide 151 (e.g., side 151*b*). In the example shown, the second optical path defined by waveguide 151 extends in the x-direction toward an output section of waveguide 151 (e.g., side 151*b*).

As shown, waveguide 152 is disposed in a same layer of system 100 as waveguide 150 (i.e., on side 186*a* of substrate 186). Waveguide 152 may extend through the page (i.e., in the y-direction) to define a third optical path inside waveguide 152. For example, waveguide 152 may be configured to guide a second light signal different than light signal 104 along the third optical path. In this example, waveguide 152 extends in a direction (e.g., y-direction) that is non-parallel to the guiding direction (e.g., x-direction) of waveguide 150, 151). Further, as shown, a first section of waveguide 152 overlaps a second section of waveguide 151. For example, the first section may be less than a threshold distance to the second section.

Thus, in this example arrangement, the multi-layer optical system 100 defines a combined optical path for light signal 104 extending in the x-direction from emitter 140 to side 151*b* of waveguide 151. A first part of this combined optical path is in a first layer of multi-layer system 100 (i.e., on substrate 186); and a second part of the combined optical path is in a second layer (i.e., on substrate 184). Additionally, system 100 defines a separate non-parallel optical path within waveguide 152, which does not intersect the combined optical path of light signal 104 (e.g., the two paths cross below or above one another in different layers of system 100).

Figure 1C:
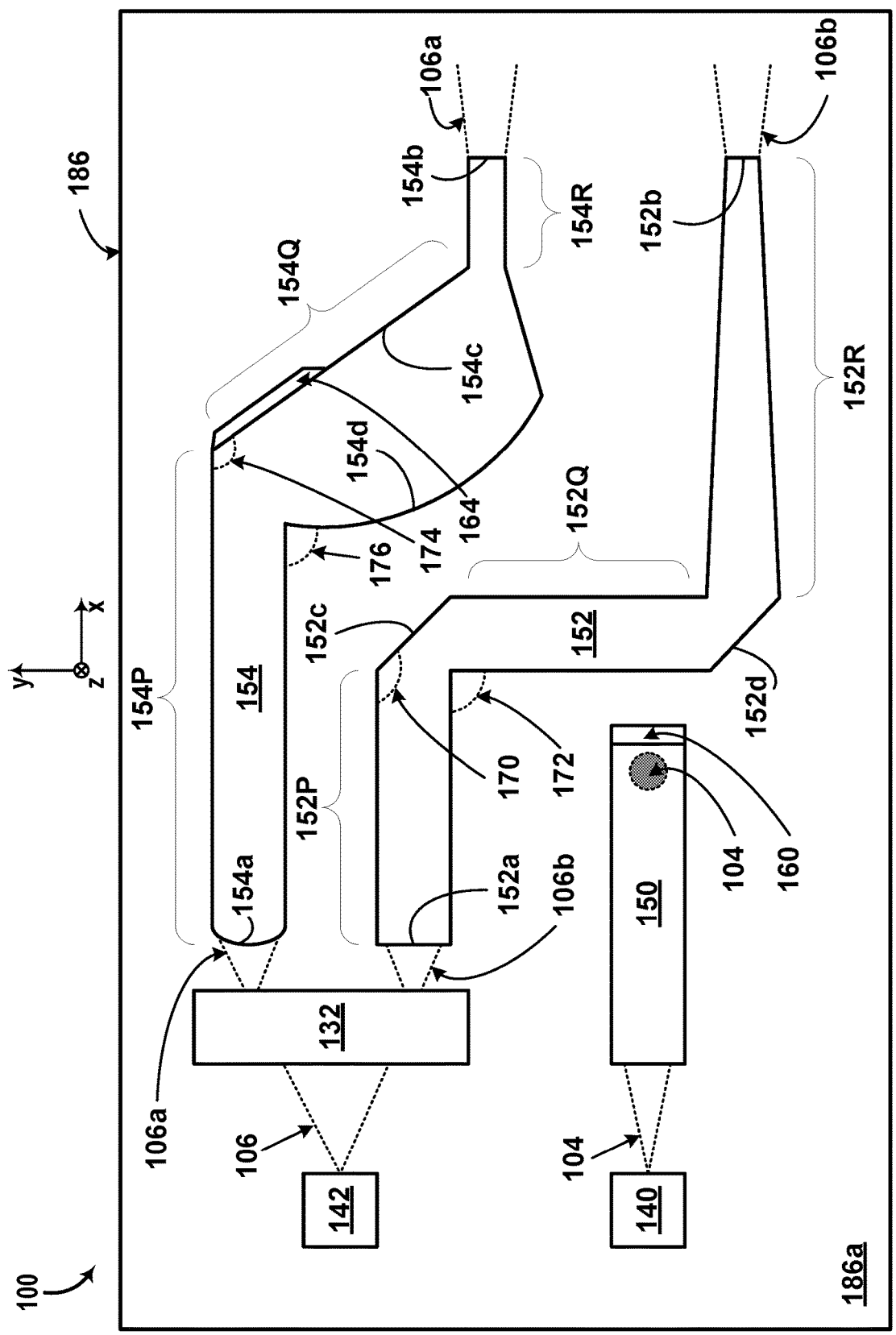
FIG. 1C illustrates another cross-section view of the system of FIG. 1A.

FIG. 1C illustrates another cross-section view of system 100. For purposes of illustration, FIG. 1C shows x-y-z axes, where the z-axis extends through the page. For example, in the cross-section view of system 100 of FIG. 1C, side 186*a* of substrate 186 may be parallel to the surface of the page, and light signal 104 (shown as the shaded region on waveguide 150) propagates out of the page toward substrate 184 (not shown in FIG. 1C). It is noted that one or more components of system 100 are omitted from one or more of the illustrations in FIGS. 1A-1C for convenience in description. Additionally, it is noted that the sizes, shapes, and positions of the various components of system 100 illustrated in FIGS. 1A-1C are not necessary to scale but are illustrated as shown for convenience in description.

As shown, system 100 includes one or more additional components disposed on side 186a of substrate 186. In particular, as shown, system 100 also includes an optical element 132, a light emitter 142, a waveguide 154, and a mirror 164. Light emitter 142 may include any light source similarly to light emitter 140, and may be configured to emit a second light signal 106. Mirror 164 may be formed similarly to any of mirrors 160, 161. In alternative examples, as noted above in the description of mirrors 160, 161, system 100 can be implemented without mirror 164 (e.g., edge 154c may be configured as a TIR mirror that internally reflects light 106a incident thereon without the presence of mirror 164, etc.).

Optical element 132 may be interposed between light emitter 142 and waveguides 152, 154, and may be configured to redirect, focus, collimate, and/or otherwise adjust optical characteristics of emitted light 106. To that end, optical element 132 may comprise any combination of optical elements, such as lenses, mirrors, cylindrical lenses, light filters, etc.

In one example, optical element 132 may comprise a cylindrical lens, and/or other optical element configured to (at least partially) collimate and/or direct light beams in light signal 106 (e.g., emitted by emitter 142) as light portions 106a and 106b toward waveguides 154 and 152, respectively. For instance, optical element 132 may transmit a relatively larger amount of energy from emitted light portion 106b into waveguide 152 by collimating the light beams. Alternatively or additionally, for instance, optical element 132 may direct emitted light portion 106b into waveguide 152 at a particular angle of entry (e.g., less than the critical angle of waveguide 460, etc.) that is suitable for light beam(s) 106b to be guided inside waveguide 152 (e.g., via total internal reflection, etc.).

By way of example, in the embodiment shown, optical element 132 is arranged substantially parallel to input side 152a of waveguide 152 (e.g., parallel to the y-axis). In alternative embodiments, optical element 132 could instead be tilted at an offset from the y-axis to adjust an angle-of-entry of light beam 106b at input end 152a of waveguide 152. In one particular embodiment, the angle-of-entry of light portion 106b is between 0 degrees and 6 degrees (e.g., 4 degrees, etc.). Other angles-of-entry of light portion 106b are possible.

As shown, optical element 132 can be implemented as a single optical element interposed between emitter 142 and waveguides 152, 154. For example, optical element 132 can be implemented as an optical fiber arranged as a cylindrical lens configured to at least partially collimate light portions 106a, 106b. In other embodiments, optical element 132 can be alternatively implemented as multiple physically separate optical elements (e.g., multiple cylindrical lenses and/or other types of optical elements).

In the example shown, waveguide 152 extends lengthwise to guide light portion 106b from input end 152a to output end 152b and extends widthwise between a first wall (which includes edge 152c) and a second wall opposite the first wall. Thus, in this example, waveguide 152 may be configured to receive light 106b at input end 152a and transmit light 106b out of waveguide 152 at output end 152b. In alternative examples, light portion 106b can be received at an input of waveguide 152 that corresponds to any portion of the waveguide (e.g., surface, edge, location, section, etc.) at which light portion 106b is incident on the waveguide. Similarly, in alternative examples, an output of waveguide 152 may instead correspond to any location, surface, edge, or section of waveguide 152 at which light portion 106b exits the waveguide.

In the example shown, a first section 152P of waveguide 152 extends lengthwise in a first direction (e.g., the section parallel to the x-axis between edge 152a and edge 152c), a second section 152Q of waveguide 152 extends lengthwise in a second direction different than the first direction (e.g., the middle section parallel to the y-axis), and a third section 152R of waveguide 152 extends lengthwise in a third direction different than the second direction (e.g., the section parallel to the x-axis between the second section and edge 152b). Thus, in this example, waveguide 152 may be configured to guide light 106b inside the first section 152P toward the second section 152Q, inside the second section 152Q toward the third section 152R, and inside the third section 152R away from the second section 152Q. In alternative examples, waveguide 152 may instead include fewer or more sections, and/or one or more sections of the waveguide may extend in different directions than those described above. Thus, in some examples, various configurations and/or shapes of waveguide 152 can be employed to accommodate different arrangements, locations, and/or combinations of components mounted on substrate 186.

In the example shown, the third direction of the third section 152R of waveguide 152 is substantially parallel to the first direction of the first section 152P (e.g., both sections are shown to extend parallel to the x-axis). In alternative examples, as noted above, the first direction and the third direction are not necessarily parallel to one another.

Edge 152c may be tilted at a first angle 170 to the first section 152P of waveguide 152 at the first wall different than a second angle 172 between the first section 152P and the second section 152Q at the second wall. For example, as shown, angle 170 may be greater than angle 172. With this arrangement for instance, light signal 106b guided inside the first section 152P may be incident on edge 152c from one or more angles-of-incidence suitable for internal reflection (e.g., TIR) of light 106b toward the second section 152Q of waveguide 152, as opposed to propagating out of the waveguide at edge 152c if the angles-of incidence were instead greater than the critical angle.

To that end, in some examples, the angle 170 at which edge 152c is tilted may vary according to one or more optical characteristics of optical system 100. In a first example, tilting angle 170 may be based on one or more wavelengths of light 106b, a refractive index of the optical material of waveguide 152, a refractive index of an optical medium (e.g., air, optical adhesive, etc.) adjacent to edge 152c, and/or any other optical property of system 100 that affects the critical angle at which total internal reflection of light 106b at edge 152c may occur. In a second example, tilting angle 170 may be selected based on an angle-of-entry of light beam 106b at input end 152a (which may affect the angles-of-incidence of light 106b upon arrival at edge 152c). For instance, as noted above, optical element 132 can be tilted to an offset the angle-of-entry of light beam 106b relative to an optical axis of the first section 152P (e.g., relative to the first direction). In a third example, tilting angle 170 can be based at least in part on the second direction of the second section 152Q of waveguide 152 (e.g., the middle section parallel to the y-axis). In one embodiment, angle 170 may be approximately 45 degrees and angle 172 may be approximately 90 degrees. However, other values of angles 170, 172 are possible as well.

In the example shown, edge 152c is a flat edge. In alternative examples, edge 152c may have a different shape than the flat shape shown in FIG. 1C (e.g., curved edge, etc.).

Although not shown, in some examples, system 100 may also include a mirror disposed on edge 152c. In these examples, the mirror may be configured to reflect at least a portion of light signal 106b exiting waveguide 152 at edge 152c back into waveguide 152 and into the second section 152Q of the waveguide (e.g., in the second direction of the second section that is parallel to the y-axis, etc.). To that end, for example, the mirror may be similar to any of mirrors 160, 161 disposed, respectively, on the tilted edges of waveguides 150, 151 (as best shown in FIG. 1B).

As shown in FIG. 1C, waveguide 152 also includes a tilted edge 152d (on the second wall) between the second section 152Q and the third section 152R of the waveguide. In line with the discussion above for edge 152c, edge 152d may be tilted at a suitable angle from the second section 152Q (e.g., greater than the angle between the second section and the third section at the first wall, etc.) to facilitate redirecting light signal 106b from the second section 152Q into the third section 152R (e.g., via TIR of light signal 106b at edge 152d, etc.).

As shown in FIG. 1C, in some examples, the third section 152R of waveguide 152 may be tapered such that a cross-sectional size of the third section 152R at output end 152b is less than the cross-sectional size of the third section 152R at a given distance to output end 152b. With this arrangement for instance, the taper configuration of the third section 152R may facilitate reducing a beam width of light beam 106b transmitted out of the waveguide at output end 152b. In alternative examples, the third section 152R of waveguide 152 may be untapered or may have a different taper configuration.

Although not shown, in some examples, one or more other sections of waveguide 152 may be tapered. In one example, the first section 152P of waveguide 152 (e.g., between input end 152a and edge 152c) may be tapered such that a cross-sectional size of the first section 152P at the input end 152a is less than the cross-sectional size of the first section 152P at a given distance from the input end 152a. With such taper configuration for instance, the width of the first section 152P may increase in the lengthwise guiding direction (i.e., first direction) of the first section 152P to reduce and/or mitigate signal leakage associated with divergence of the guided light portion 106b inside the first section 152P. Alternatively, in other examples, the first section 152P may have a different taper configuration, or may have an untapered configuration (such as the configuration shown in FIG. 1C).

In some examples, one or more walls (or edges) of any of waveguides 150, 151, 152, and/or 154 may include a grating.

In one example, edge 152c may include a diffraction grating. For instance, edge 152c may be shaped according to a grating pattern that causes incident light thereon to be reflected and/or diffracted in a particular manner (e.g., in a non-normal direction, etc.). In this example, the grating pattern on edge 152c may thus facilitate selecting a different angle 172 than the angle shown and/or otherwise redirecting light incident on the edge into section 152Q.

In another example, edge 152c may be alternatively shaped to have a grating pattern that selectively transmits a first portion of the guided light out of waveguide 152 at edge 152c based on the first portion having a particular wavelength (or being within a wavelength range) associated with the grating pattern. Thus, in this example, waveguide 152 may be configured to direct the first portion out of the waveguide at edge 152c, and to direct a second portion of the guided light into section 152Q based on the second portion having different wavelength(s) than the wavelength(s) of the first portion.

In other examples, waveguides 150, 151, 152, and/or 154 may similarly include one or more diffraction gratings at one or more walls and/or edges of the waveguides. For example, edge 154c may alternatively include a diffraction grating configured to reflect guided light 106a incident thereon toward edge 154d without the presence of mirror 164. Other examples are possible.

As noted above, in some implementations, the waveguides 150, 151, 152, 154, etc. may be formed formed by selectively etching photoresist material disposed on the substrates.

In one implementation, a grating pattern can be included in a particular sidewall (or edge) of a waveguide based on features of a mask that filters exposure light applied to cure the portion of the photoresist material that corresponds to the waveguide.

In another implementation, a surface relief grating (SRG) can be applied on a particular region of substrates 184, 186, etc. prior to depositing the photoresist material on the substrate (and prior to exposing/curing the portions of the photoresist material corresponding to the waveguides). When photoresist material is then disposed on the substrate for instance, the SRG could define the grating pattern of a wall of the waveguide corresponding to a portion of the photoresist material disposed on the SRG.

With this arrangement, referring back to FIG. 1B for example, edge 150b of waveguide 150 may alternatively be implemented without mirror 160 and without being tilted edge 150c. For instance, a region of substrate 186 at the output end of waveguide 150 can be etched according to a particular grating pattern as the SRG. In this example, guided light can be transmitted out of waveguide 150 by diffracting at the grated portion of the waveguide where the SRG is located (e.g., instead of being reflected by mirror 160).

In an alternate example, instead of etching the substrate to form the SRG, the SRG can be implemented as a solid structure (e.g., plastic or other optical structure having a different index of refraction than the photoresist material) that is disposed on the substrate prior to depositing the photoresist material.

Waveguide 154 may be formed similarly to any of waveguides 150, 151, and 152, and may define another optical path for another portion 106a of light 106.

In the example shown, waveguide 154 extends lengthwise from input end 154a to output end 154b; and extends widthwise between a first wall (which includes flat edge 154c) and a second wall (which includes curved edge 154d) opposite the first wall. Thus, in this example, waveguide 154 may be configured to receive light 106a at input end 154a and transmit light 106a out of waveguide 154 at output end 154b. In alternative examples, light portion 106a can be received at an input of waveguide 154 that corresponds to any portion of the waveguide (e.g., surface, edge, location, section, etc.) at which light portion 106a is incident on the waveguide. Similarly, in alternative examples, an output of waveguide 154 may instead correspond to any location, surface, edge, or section of waveguide 154 at which light portion 106*a* exits the waveguide.

In the example shown, input side 154*a* includes a curved surface (e.g., curved away from waveguide 154). With this configuration for instance, input end 154*a* may focus and/or re-direct light 106*a* incident thereon into the waveguide according to the curved shape of input surface 154*a*. Thus, in some embodiments, a curvature configuration of input side 151*a* can be selected to facilitate controlling the divergence and/or direction of light beam 106*a* entering the waveguide.

In alternative examples, input end 154*a* may instead include a flat edge similarly to input end 152*a* of waveguide 152. Further, in some examples, input end 152*a* of waveguide 152 may similarly have a curved surface instead of the flat surface shown in FIG. 1C.

In the example shown, a first section 154P of waveguide 154 extends lengthwise in a first direction (e.g., the section parallel to the x-axis between edge 154*a* and edge 154*c*); a second section 154Q of waveguide 154 extends lengthwise in a second direction different than the first direction (e.g., the middle section); and a third section 154R of waveguide 154 extends lengthwise in a third direction different than the second direction (e.g., the section parallel to the x-axis between the second section and edge 154*b*). Thus, in this example, waveguide 154 may be configured to guide light 106*a* inside the first section 154P toward the second section 154Q, inside the second section 154Q toward the third section 154R, and inside the third section 154R away from the second section 154Q. In alternative examples, waveguide 154 may instead include fewer or more sections, and/or one or more sections of the waveguide may extend in different directions than shown in FIG. 1C. Thus, in some examples, various configurations and/or shapes of waveguide 154 can be employed to accommodate different arrangements, locations, and/or combinations of components mounted on substrate 186.

In the example shown, the second section 154Q of waveguide 154 has a flat edge 154*c* (in the first wall) that is tilted at a third angle 174 relative to the first section 154P of waveguide 154, and a curved edge 154*d* (in the second wall) opposite the flat edge 154*c*. As shown, the third angle 174 may be different than a fourth angle 176 between the first section 154P of waveguide 154 and the second section 154Q of waveguide 154 (at the second wall).

As shown, mirror 164 may be disposed on flat edge 154*c*. For example, mirror 164 may be configured to receive at least a portion light signal 106*a* incident on flat edge 154*c* from the first section 154P of waveguide 154 and transmitted out from the waveguide at the flat edge. Mirror 164 may then reflect the received light 106*a* incident thereon back into the waveguide and toward the curved edge 154*d*. In this example, curved edge 154*d* may then reflect (e.g., via TIR) the light 106*a* incident thereon toward the third section 154R of waveguide 154. For example, curved edge 154*d* may be curved away from waveguide 154 to define a concave-shaped surface inside the waveguide that reflects (and/or focuses) incident portions of light 106*a* into the third section 154R of waveguide 154. In this way, for instance, the curved edge 154*d* may facilitate controlling/reducing a beam width of light beam 106*a* exiting the waveguide at output end 154*b* by "funneling" the light signal 106*a* into the third section 154R. Thus, in the example shown, a cross-sectional size of the third section 154R of waveguide 154 (e.g., at output end 154*b*, etc.) may be less than a cross-sectional size of the first section 154P of waveguide 154 (e.g., at input end 154*a*, etc.).

In alternative examples, system 100 may be implemented without mirror 164. For instance, tilting angle 174 can be selected such that light 106*a* is incident on edge 154*c* from one or more angles-of-incidence suitable for internally reflecting light 106*a* (e.g., via TIR) at edge 154*c* toward edge 154*d* (e.g., instead of being reflected from mirror 164).

In some examples, edge 154*c* of the second section 154Q may alternatively be configured as a curved edge (e.g., similarly to edge 154*d*) instead of having a flat edge configuration as shown in the example of FIG. 1C.

In a first example, edge 154*c* may be curved away from waveguide 154 to define a concave surface (inside the waveguide) that redirects (and/or focuses) light 106*a* incident thereon (e.g., via TIR) toward curved edge 154*d*. With this configuration for instance, the curved edge 154*c* may further facilitate "funneling" light 106*a*, in line with the discussion above in the description of curved edge 154*d*. Further, in the first example, system 100 could thus be implemented without a mirror 164 (e.g., edge 154*c* may correspond to a TIR mirror, etc.).

Alternatively, in a second example, edge 154*c* may have the curved configuration of the first example and system 100 may also include mirror 164. For instance, in the second example, mirror 164 may be alternatively configured as a curved mirror (e.g., concave mirror) disposed on curved edge 154*c* (instead of having the flat mirror configuration shown).

In a third example, edge 154*c* can be alternatively curved inwards (i.e., toward the waveguide) to define a convex surface 154*c* inside the waveguide. Other examples and/or shapes of edge 154*c* are possible as well.

As noted above, an optical system such as system 100 can be employed for routing optical signals for a wide variety of devices in various technology fields, such as light detection and ranging (LIDAR) devices, medical imaging devices, data communication systems, among other examples.

Figure 2A:
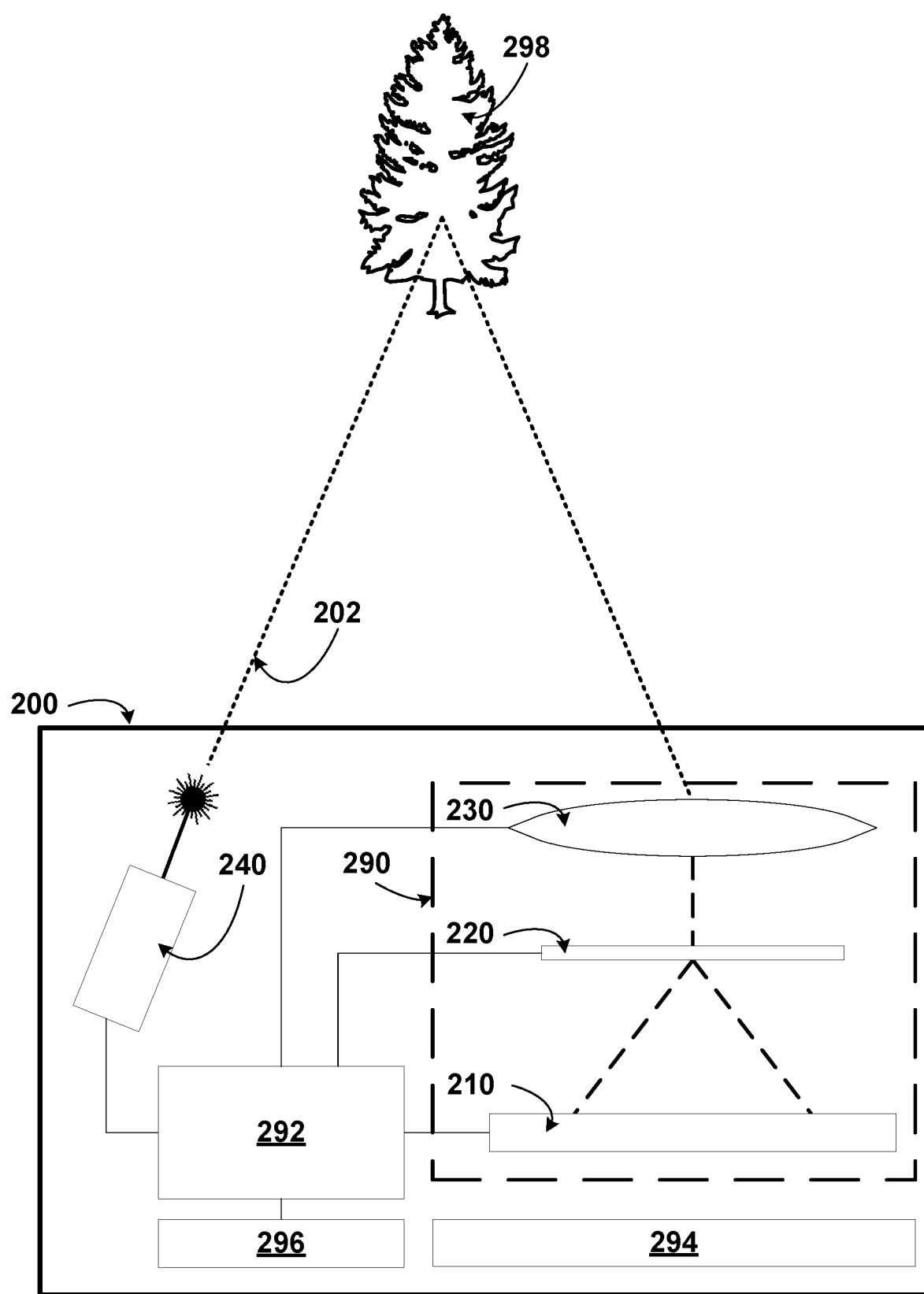
FIG. 2A is a simplified block diagram of a LIDAR device, according to example embodiments.

FIG. 2A is a simplified block diagram of a LIDAR device 200, according to example embodiments. In some examples, LIDAR device 200 can be mounted to a vehicle and employed to map a surrounding environment (e.g., a scene including object 298, etc.) of the vehicle. As shown, LIDAR 200 includes a laser emitter 240 that may be similar to emitter 140, an optical system 290, a controller 292, a rotating platform 294, and one or more actuators 296.

System 290 includes one or more light detectors 210, an opaque material 220, and a lens 230. It is noted that LIDAR device 200 may alternatively include more or fewer components than those shown, such as any of the components described for system 100 (e.g., waveguides, etc.).

Detector(s) 210 may include one or more light detectors. In one embodiment, detector(s) 210 include an array of light detectors that define a detection region for detecting the light 202 focused by lens 230. Additionally, light detector(s) 210 may include various types of light detectors, such as photodiodes, single photon avalanche diodes (SPADs), other types of avalanche photodiodes (APDs), silicon photomultipliers (SiPMs), multi-pixel photon counters (MPPCs), photoresistors, charge-coupled devices (CCDs), photovoltaic cells, and/or any other type of light detector.

Opaque material 220 (e.g., mask, aperture stop, etc.) may block a portion of light 202 returning from the scene (e.g., background light) and focused by the lens 230 from being transmitted to detector(s) 210. For example, opaque material 220 may be configured to block certain background light that could adversely affect the accuracy of a measurement performed by detector(s) 210. Alternatively or additionally, opaque material 220 may block light in the wavelength range detectable by detector(s) 210, etc. In one example, opaque material 220 may block transmission by absorbing a portion of incident light. In another example, opaque material 220 may block transmission by reflecting a portion of incident light. A non-exhaustive list of example implementations of opaque material 220 includes an etched metal, a polymer substrate, a biaxially-oriented polyethylene terephthalate (BoPET) sheet, or a glass overlaid with an opaque mask, among other possibilities. In some examples, opaque material 220 may include one or more apertures through which focused light 202 (or a portion thereof) may be transmitted through opaque material 220.

Lens 230 may focus light 202 returning from the scene toward the aperture of opaque material 220. With this arrangement, the light intensity collected from the scene, at lens 230, may be focused to have a reduced cross-sectional area over which light 202 is projected (i.e., increased spatial power density of light 202). To that end, lens 230 may include a converging lens, a biconvex lens, and/or a spherical lens, among other examples. Alternatively, lens 230 can be implemented as a consecutive set of lenses positioned one after another (e.g., a biconvex lens that focuses light in a first direction and an additional biconvex lens that focuses light in a second direction). Other types of lenses and/or lens arrangements are also possible. In addition, system 290 may include other optical elements (e.g., mirrors, etc.) positioned near lens 230 to aid in focusing light 202 incident on lens 230 onto opaque material 220.

Device 200 may operate emitter 240 to emit light 202 toward a scene that includes object 298. To that end, in some implementations, emitter 240 (and/or one or more other components of device 200) can be configured as a LIDAR transmitter of LIDAR device 200. Device 200 may then detect reflections of light 202 returning from the scene to determine information about object 298. To that end, in some implementations, detector(s) 210 (and/or one or more other components of system 290) can be configured as a LIDAR receiver of LIDAR device 200.

Controller 292 may be configured to control one or more components of LIDAR device 200 and to analyze signals received from the one or more components. To that end, controller 292 may include one or more processors (e.g., a microprocessor, etc.) that execute instructions stored in a memory (not shown) of device 200 to operate device 200. Additionally or alternatively, controller 292 may include digital or analog circuitry wired to perform one or more of the various functions described herein.

Rotating platform 294 may be configured to rotate about an axis to adjust a pointing direction of LIDAR 200 (e.g., direction of emitted light 202 relative to the environment, etc.). To that end, rotating platform 294 can be formed from any solid material suitable for supporting one or more components of LIDAR 200. For example, system 290 (and/or emitter 240) may be supported (directly or indirectly) by rotating platform 294 such that each of these components moves relative to the environment while remaining in a particular relative arrangement in response to rotation of rotating platform 294. In particular, the mounted components could be rotated (simultaneously) about an axis so that LIDAR 200 may adjust its pointing direction while scanning the surrounding environment. In this manner, a pointing direction of LIDAR 200 can be adjusted horizontally by actuating rotating platform 294 to different directions about the axis of rotation. In one example, LIDAR 200 can be mounted on a vehicle, and rotating platform 294 can be rotated to scan regions of the surrounding environment at various directions from the vehicle.

In order to rotate platform 294 in this manner, one or more actuators 296 may actuate rotating platform 294. To that end, actuators 296 may include motors, pneumatic actuators, hydraulic pistons, and/or piezoelectric actuators, among other possibilities.

With this arrangement, controller 292 could operate actuator(s) 296 to rotate rotating platform 294 in various ways so as to obtain information about the environment. In one example, rotating platform 294 could be rotated in either direction about an axis. In another example, rotating platform 294 may carry out complete revolutions about the axis such that LIDAR 200 scans a 360° field-of-view (FOV) of the environment. In yet another example, rotating platform 294 can be rotated within a particular range (e.g., by repeatedly rotating from a first angular position about the axis to a second angular position and back to the first angular position, etc.) to scan a narrower FOV of the environment. Other examples are possible.

Moreover, rotating platform 294 could be rotated at various frequencies so as to cause LIDAR 200 to scan the environment at various refresh rates. In one embodiment, LIDAR 200 may be configured to have a refresh rate between 3 Hz and 30 Hz. For example, where LIDAR 200 is configured to scan a 360° FOV at a refresh rate of 10 Hz, actuator(s) 296 may rotate platform 294 for ten complete rotations per second. Other refresh rates are possible.

Figure 2B:
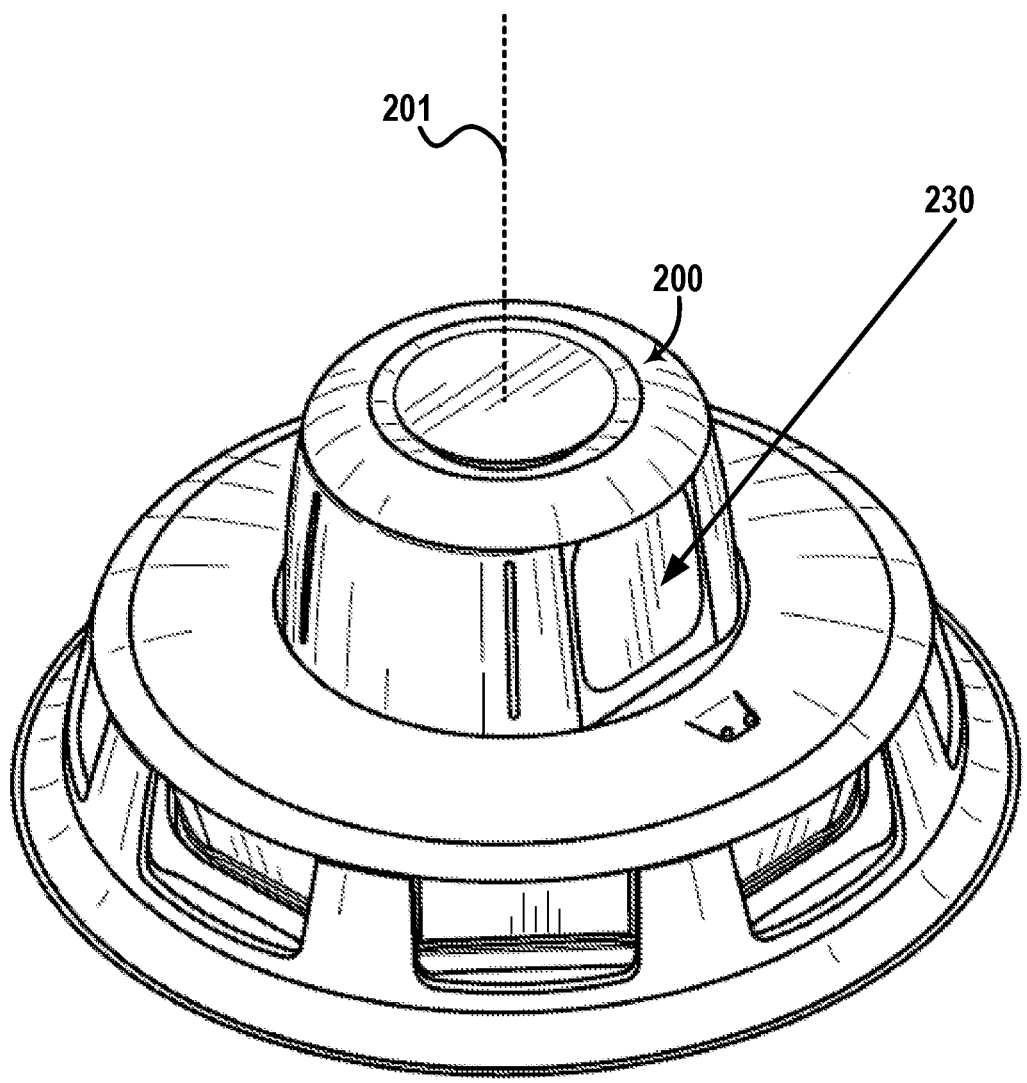
FIG. 2B illustrates a perspective view of the LIDAR device of FIG. 2A.

FIG. 2B illustrates a perspective view of LIDAR device 200. In some embodiments, device 200 may be configured to include a single shared lens 230 for both directing emitted light from emitter 240 toward the environment and focusing incident light 202 into system 290. In other embodiments, device 200 may include a separate transmitter lens (not shown) for directing the emitted light 240 different than the lens 230.

As shown in FIG. 2B, LIDAR 200 may be configured to rotate about an axis of rotation 201. In this way, LIDAR 200 can scan different regions of the surrounding environment according to different rotational positions of LIDAR 200 about axis 201. For instance, device 200 (and/or another computing system) can determine a three-dimensional map of a 360° (or less) view of the environment of device 200 by processing data associated with different pointing directions of LIDAR 200 as the LIDAR rotates about axis 201.

In some examples, axis 201 may be substantially vertical. In these examples, the pointing direction of device 200 can be adjusted horizontally by rotating system 290 (and emitter 240) about axis 201.

In some examples, system 290 (and emitter 240) can be tilted (relative to axis 201) to adjust the vertical extents of the FOV of LIDAR 200. By way of example, LIDAR device 200 can be mounted on top of a vehicle. In this example, system 290 (and emitter 240) can be tilted (e.g., toward the vehicle) to collect more data points from regions of the environment that are closer to a driving surface on which the vehicle is located than data points from regions of the environment that are above the vehicle. Other mounting positions, tilting configurations, and/or applications of LIDAR device 200 are possible as well (e.g., on a different side of the vehicle, on a robotic device, or on any other mounting surface).

Returning now to FIG. 2A, in some implementations, controller 292 may use timing information associated with a signal measured by array 210 to determine a location (e.g., distance from LIDAR device 200) of object 298. For example, in embodiments where emitter 240 is a pulsed laser, controller 292 can monitor timings of output light pulses and compare those timings with timings of signal pulses measured by array 210. For instance, controller 292 can estimate a distance between device 200 and object 298 based on the speed of light and the time of travel of the light pulse (which can be calculated by comparing the timings). In one implementation, during the rotation of platform 294, emitter 240 may emit light pulses (e.g., light 202), and system 290 may detect reflections of the emitted light pulses. Device 200 (or another computer system that processes data from device 200) can then generate a three-dimensional (3D) representation of the scanned environment based on a comparison of one or more characteristics (e.g., timing, pulse length, light intensity, etc.) of the emitted light pulses and the detected reflections thereof.

It is noted that the various functional blocks shown for the components of device 200 can be redistributed, rearranged, combined, and/or separated in various ways different than the arrangement shown.

Figure 3A:
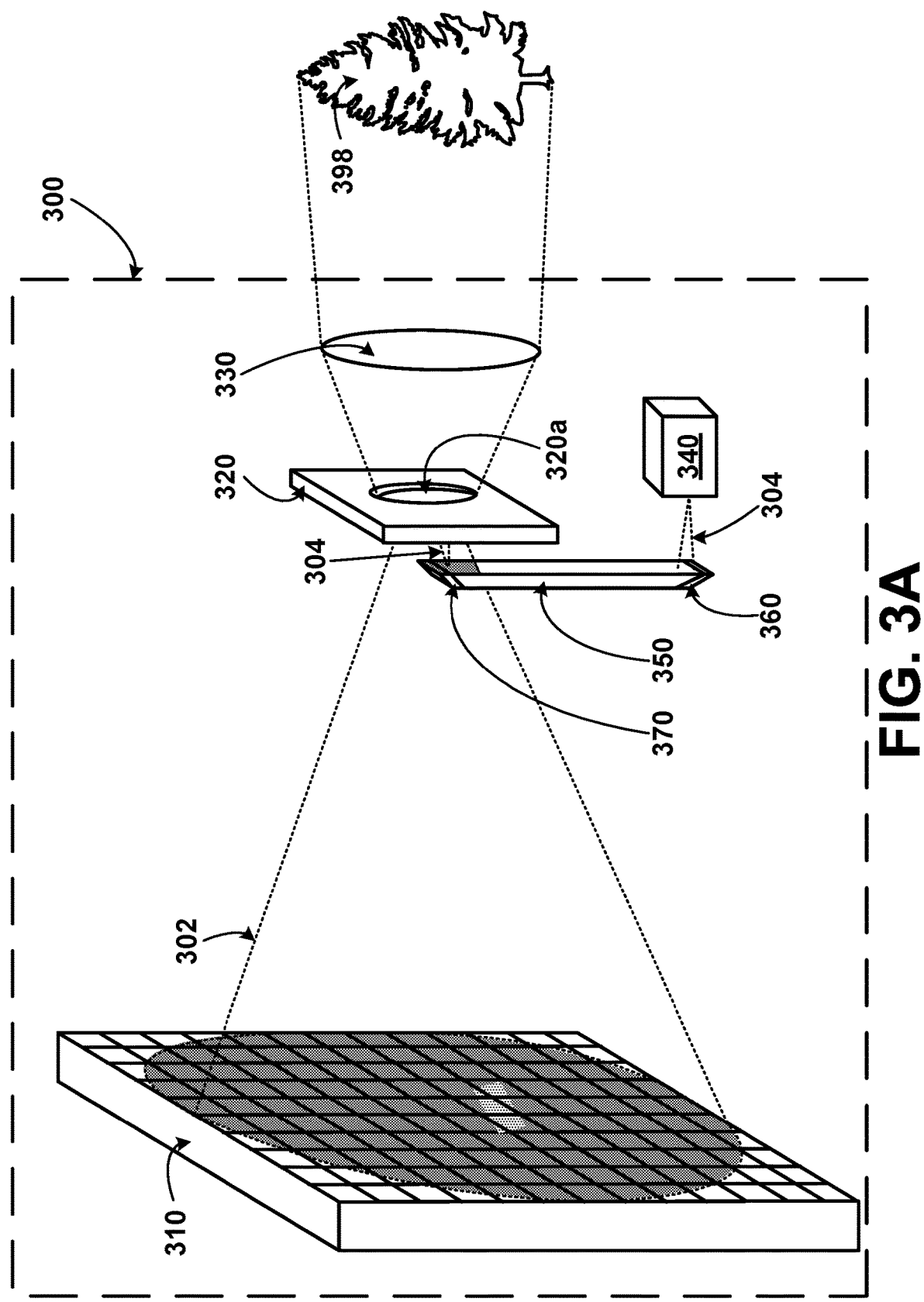
FIG. 3A is an illustration of a system that includes a waveguide, according to example embodiments.

FIG. 3A is an illustration of a system 300 that includes a waveguide 350, according to example embodiments. FIG. 3B illustrates a cross-section view of the system 300. In some implementations, system 300 can be included in device 200 instead of or in addition to transmitter 240 and system 290. As shown, system 300 may measure light 302 reflected by an object 398 within a scene similarly to, respectively, device 200, light 202, and object 298. Further, as shown, system 300 includes a light detector array of light detectors 310, an opaque material 320, a lens 330, and a light source 340, which may be similar, respectively, to detector (s) 210, material 220, lens 230, and emitter 240.

As shown, system 100 also includes an aperture 320a defined within opaque material 320. For the sake of example, aperture 320a is shown to have an elliptical shape. However, other aperture shapes are possible (e.g., circular, rectangular, or any other shape). Aperture 320a provides a port within opaque material 320 through which light may be transmitted. Aperture 320a may be defined within opaque material 320 in a variety of ways. In one example, opaque material 320 (e.g., metal, etc.) may be etched to define aperture 320a. In another example, opaque material 320 may be configured as a glass substrate overlaid with a mask, and the mask may include a gap that defines aperture 320a (e.g., via photolithography, etc.). In various embodiments, aperture 320a may be partially or wholly transparent, at least to wavelengths of light that are detectable by light detector array 310. For example, where opaque material 320 is a glass substrate overlaid with a mask, aperture 320a may be defined as a portion of the glass substrate not covered by the mask, such that aperture 320a is not completely hollow but rather made of glass. Thus, in some instances, aperture 320a may be partially, but not entirely, transparent to one or more wavelengths of light 302. Alternatively, in some instances, aperture 320a may be formed as a hollow region of opaque material 320. Other aperture implementations are possible.

As shown, system 300 also includes waveguide 350 (e.g., optical waveguide, etc.), which may be similar to any of waveguides 150, 151, and/or 152. As shown, system 300 also includes an input mirror 360 and an output mirror 370, which may be similar to any of mirrors 160 and/or 161.

In the example shown, waveguide 350 is positioned between opaque material 320 and array 310. However, in other examples, opaque material 320 can be instead positioned between waveguide 350 and array 310. As shown, waveguide 350 may be arranged such that a portion of waveguide 350 extends into a propagation path of focused light 302, and another portion of waveguide 350 extends outside the propagation path of focused light 302. As a result, a first portion of focused light 302 transmitted through aperture 320a may be projected onto waveguide 350 (as illustrated by the shaded region on the surface of waveguide 350).

As best shown in FIG. 3B, a second portion of focused light 302 may propagate from lens 330 to array 310 without propagating through waveguide 350.

In some instances, at least part of the first portion of focused light 302 (projected onto waveguide 350) may propagate through transparent regions of waveguide 350 (e.g., from side 350c to side 350d and then out of waveguide 350 toward array 310, without being intercepted by mirror 370. However, in some instances, the first portion of focused light 302 may be at least partially intercepted by mirror 370 and then reflected away from array 310 (e.g., guided inside waveguide 350, etc.).

To mitigate this, in some examples, mirror 370 can be configured to have a small size relative to aperture 320a and/or relative to a projection area of focused light 302 at the location of mirror 370. In these examples, a larger portion of focused light 302 may propagate adjacent to mirror 370 (and/or waveguide 350) to continue propagating toward array 310. Alternatively or additionally, in some examples, mirror 370 can be formed from a partially or selectively reflective material (e.g., half mirror, dichroic mirror, polarizing beam splitter, etc.) that transmits at least a portion of focused light 302 incident thereon through mirror 370 for propagation toward array 310. Thus, in these examples as well, a larger amount of focused light 302 may eventually reach array 310.

In some examples, input mirror 360 may be configured to direct emitted light 304 (intercepted by mirror 360 from emitter 340) into waveguide 350. Waveguide 350 then guides light 304 inside waveguide 350 toward output mirror 370. Output mirror 370 may then reflect guided light 304 out of waveguide 350 and toward aperture 320a.

As best shown in FIG. 3B for example, input mirror 360 may be tilted at an offset angle 359 toward side 350c of waveguide 350. For example, an angle between mirror 360 and side 350c may be less than an angle between mirror 360 and side 360d. In one implementation, offset or tilting angle 359 of mirror 360 is 45°. However, other angles are possible. In the embodiment shown, input mirror 360 is disposed on side 350a of waveguide 350. Thus, in this embodiment, emitted light 304 may propagate into waveguide 350 through side 350c and then out of side 350a toward mirror 360. Mirror 360 may then reflect light 304 back into waveguide 350 through side 350a at a suitable angle of entry so that waveguide 350 can then guide light 304 toward side 350b. For example, waveguide 350 can be formed such that angle 359 between sides 350a and 350c is less than the angle between side 350a and side 350d (i.e., side 350a tilted toward side 350c). Input mirror 360 can then be deposited onto side 350a (e.g., via chemical vapor deposition, sputtering, mechanical coupling, or another process). However, in other embodiments, mirror 360 can be alternatively disposed inside waveguide 350 (e.g., between sides 350a and 350b), or may be physically separated from waveguide 350.

As best shown in FIG. 3B, output mirror 370 may also be tilted toward side 350c of waveguide 350. For example, an angle 371 between mirror 370 and side 350c may be less than an angle between mirror 370 and side 360d. In one implementation, offset or tilting angle 371 of mirror 370 is 45°. However, other angles are possible. Thus, in some examples, input mirror 360 may be tilted in a first direction (e.g., clockwise in the view of FIG. 3B) toward side 350c, and output mirror 370 may be tilted in a second direction (e.g., opposite to the first direction) toward side 350c. Output mirror 370 can be physically implemented in various ways similarly to mirror 360 (e.g., disposed on tilted side 350b of waveguide 350, etc.).

In some examples, waveguide 350 may be formed from a material that has a different index of refraction than that of materials surrounding waveguide 350. Thus, waveguide 350 may guide at least a portion of light propagating inside the waveguide via internal reflection (e.g., total internal reflection, frustrated total internal reflection, etc.) at one or more edges, sides, walls, etc., of waveguide 350. For instance, as shown in FIG. 3B, waveguide 350 may guide emitted light 304 (received from emitter 340) toward side 350b via internal reflection at sides 350c, 350d, and/or other sides of waveguide 350.

As shown in FIG. 3B, aperture 320a could be located adjacent to an output section of waveguide 350 to transmit light 304 toward lens 330. Lens 330 may then direct light 304 toward a scene. Emitted light 304 may then reflect off one or more objects (e.g., object 398) in the scene, and return to lens 330 (e.g., as part of light 302 from the scene). Lens 330 may then focus light 302 (which includes reflections of the emitted light 304) through aperture 320a and toward array 310.

With this arrangement, system 300 may emit light 304 from a substantially same physical location (e.g., aperture 320a) from which system 300 receives focused light 302 (e.g., aperture 320a). Because the transmit path of emitted light 304 and the receive path of focused light 302 are co-aligned (e.g., both paths are from the point-of-view of aperture 320a), system 300 may be less susceptible to the effects of parallax. For instance, data from a LIDAR device that includes system 300 could be used to generate a representation of the scene (e.g., point cloud) that is less susceptible to errors related to parallax.

It is noted that the sizes, positions, orientations, and shapes of the components and features of system 300 shown are not necessarily to scale, but are illustrated as shown only for convenience in description. It is also noted that system 300 may include fewer or more components than those shown, and one or more of the components shown could be arranged differently, physically combined, and/or physically divided into separate components.

In a first embodiment, waveguide 350 can alternatively have a cylindrical shape or any other shape. Additionally, in some examples, waveguide 350 can be implemented as a rigid structure (e.g., slab waveguide) or as a flexible structure (e.g., optical fiber). In a second embodiment, waveguide 350 may have a curved shape or other type of shape instead of the vertical rectangular configuration shown in FIGS. 3A and 3B. In a third embodiment, waveguide 350 can be alternatively implemented without a tilted edge 350a. For example, side 350a can be at a same (e.g., perpendicular, etc.) angle relative to sides 350c and 350d. In a fourth embodiment, mirrors 360, 370 can be omitted from system 300, and waveguide 350 can instead be configured to perform the functions described above for mirrors 360, 370. For example, sides 350a and 350b of waveguide 350 can be implemented as TIR mirrors that reflect light 304 into or out of waveguide 350.

FIG. 4A illustrates a first cross-section view of a system 400 that includes multiple waveguides, according to example embodiments. For purposes of illustration, FIG. 4A shows x-y-z axes, where the z-axis extends through the page. System 400 may be similar to systems 100, 290, and/or 300, and can be used with LIDAR device 200 instead of or in addition to system 290 and transmitter 240.

As shown, system 400 includes transmitters 440 and 442, each of which may be similar to emitter 140; a plurality of waveguides 450, 452, 454, 456, each of which may be similar to waveguide 150; and a plurality of output mirrors 460, 462, 464, 466, each of which may be similar to mirror 160. In some examples, the optical components of system 400 shown in FIG. 4A may correspond to a first layer of optical components disposed on a first substrate (e.g., substrate 186) of a plurality of overlapping substrates. Referring back to FIG. 1B for example, the side of waveguide 450 extending along the surface of the page may be similar to side 150c of waveguide 150.

In the example shown, transmitter 440 emits a first light signal 404, and transmitter 442 emits a second light signal 406. Waveguide 450 receives and guides a first light portion 404a of light signal 404 toward mirror 460, which then reflects light portion 404a out of waveguide 450 at an output section of the waveguide (illustrated as a shaded region of the waveguide) in the z-direction (i.e., out of the page). Similarly, waveguide 452 guides a second light portion 404b of the first light signal 404 along a second optical path; waveguide 454 guides a third light portion 406a of the second light signal 406 along a third optical path; and waveguide 456 guides a fourth light portion 406b along a fourth optical path.

Figure 4B:
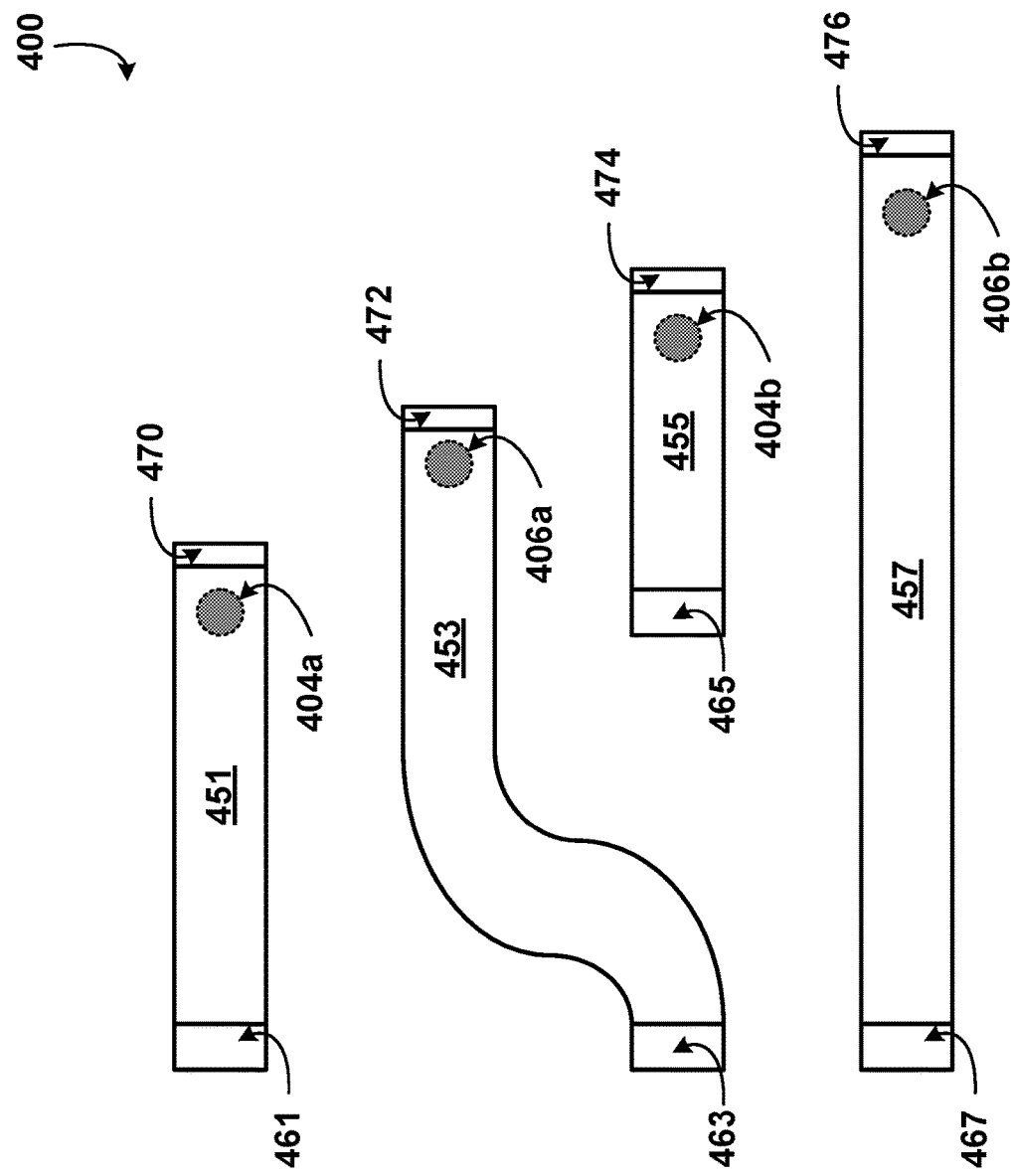
FIG. 4B illustrates a second cross-section view of the system of FIG. 4A.

FIG. 4B illustrates a second cross-section view of system 400, where the z-axis also extends through the page. As shown in FIG. 4B, system 400 also includes waveguides 451, 453, 455, 457, each of which may be similar to waveguide 151 of system 100; input mirrors 461, 463, 465, 467, each of which may be similar to mirror 161 of system 100; and output mirrors 470, 472, 474, 476, each of which may be similar to mirror 370 of system 300.

The optical components of system 400 shown in FIG. 4B may correspond to a second layer of optical components that overlaps the first layer of optical components shown in FIG. 4A. By way of example, referring back to FIG. 1B, the optical components of system 400 shown in FIG. 4A could be disposed on surface 186a of substrate 186; and the optical components of system 400 shown in FIG. 4B could be disposed on surface 184a of substrate 184. In this example, the side of waveguide 451 along the surface of the page in FIG. 4B may be similar to a side of waveguide 151 that is disposed on substrate 184 in FIG. 1B.

For instance, similarly to mirror 161 of system 100, input mirror 461 of system 400 may receive light portion 404a (transmitted out of waveguide 450 as shown in FIG. 4A). Mirror 461 may then reflect the light portion 404a incident thereon back into waveguide 451, and the waveguide may then guide light portion 404a toward mirror 470. Similarly to output mirror 370 of waveguide 350, output mirror 470 may then reflect light portion 404a out of waveguide 451 at an output section (shaded region) of the waveguide in the z-direction (out of the page).

Similarly, as shown in FIG. 4B, input mirror 463, waveguide 453, and output mirror 472 define an optical path for light portion 406a; input mirror 465, waveguide 455, and output mirror 474 define an optical path for light portion 404b; input mirror 467, waveguide 457, and output mirror 476 define an optical path for light portion 406b.

Figure 4C:
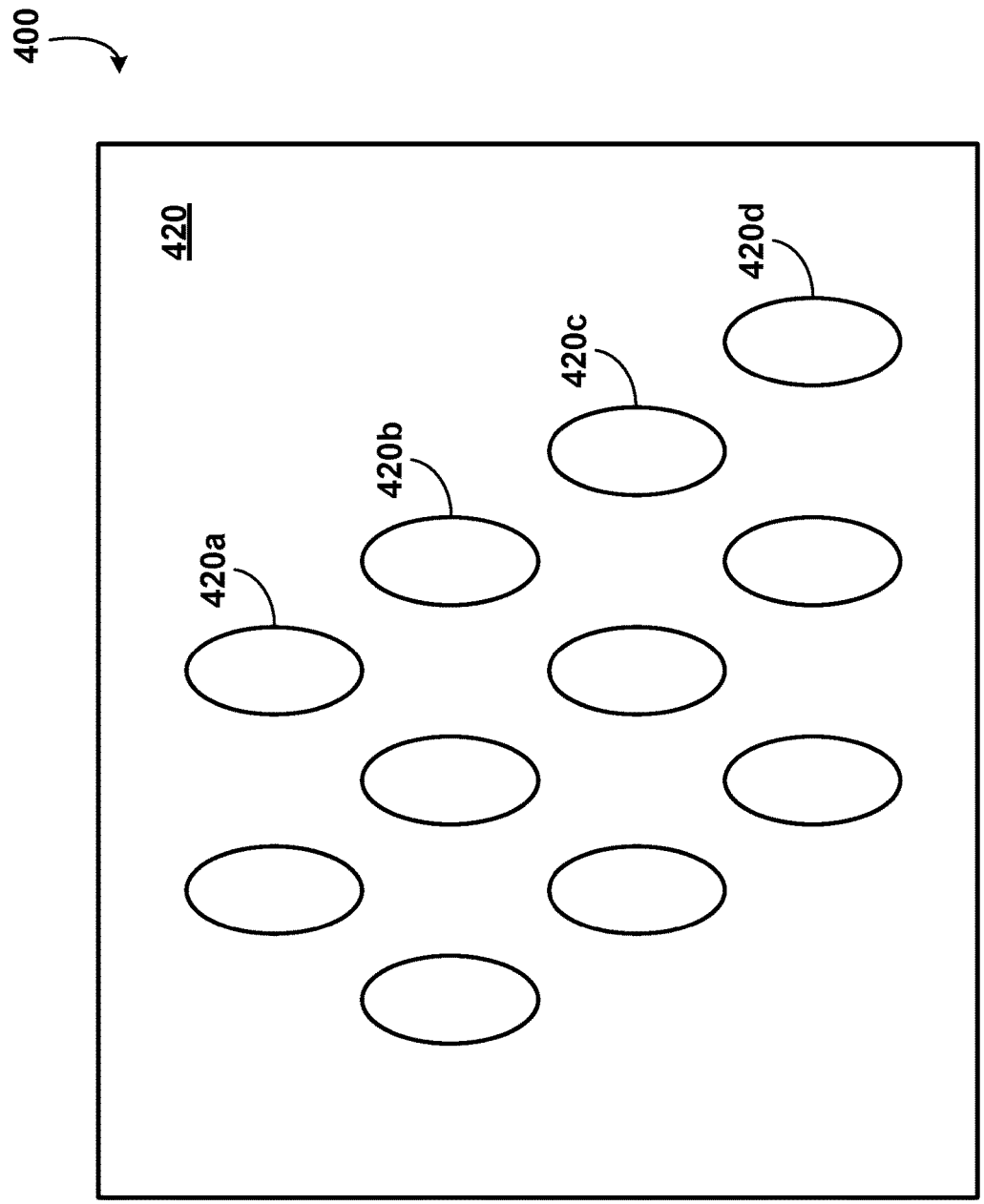
FIG. 4C illustrates a third cross-section view of the system of FIG. 4A.
Figure 4C:
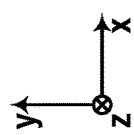

FIG. 4C illustrates a third cross-section view of system 400, according to example embodiments. As shown in FIG. 4C, system 400 also includes an opaque material 420, which may be similar to opaque material 320 of system 300. As shown in FIG. 4C, opaque material 420 defines a plurality of apertures, exemplified by apertures 420a, 420b, 420c, and 420d, each of which may be similar to aperture 320a. For example, aperture 420a may be aligned with output mirror 470 similarly to, respectively, aperture 320a and output mirror 370. For instance, aperture 420a may overlap output mirror 470 in the direction of the z-axis to receive light 404a reflected by output mirror 470 out of waveguide 450. Similarly, aperture 420b can be aligned with output mirror 472 to receive light portion 406a, aperture 420c could be aligned with output mirror 474 to receive light portion 404b, and aperture 420d could be aligned with output mirror 476 to receive light portion 404 b. Thus, each aperture may be associated with a position of a respective transmit channel of system 400.

Additionally, in some examples, light from a scene (e.g., propagating into the page in FIG. 4B) could be focused onto opaque material 420, similarly to light 302 that is focused onto opaque material 320. In these examples, system 400 may thus provide multiple receive channels associated with respective portions of the focused light projected on opaque material 420 at the respective positions of apertures 420a, 420b, 420c, 420d, etc. For example, a first portion of the focused light transmitted through aperture 420a could be intercepted by a first light detector associated with a first receive channel, a second portion of the focused light transmitted through aperture 420b could be intercepted by a second light detector associated with a second receive channel, a third portion of the focused light transmitted through aperture 420c could be intercepted by a third light detector associated with a third receive channel, and a fourth portion of the focused light transmitted through aperture 420d could be intercepted by a fourth light detector associated with a fourth receive channel.

With this arrangement, each transmit channel may be associated with a transmit path that is spatially co-aligned (through a respective aperture) with a receive path associated with a corresponding receive channel.

Figure 4D:
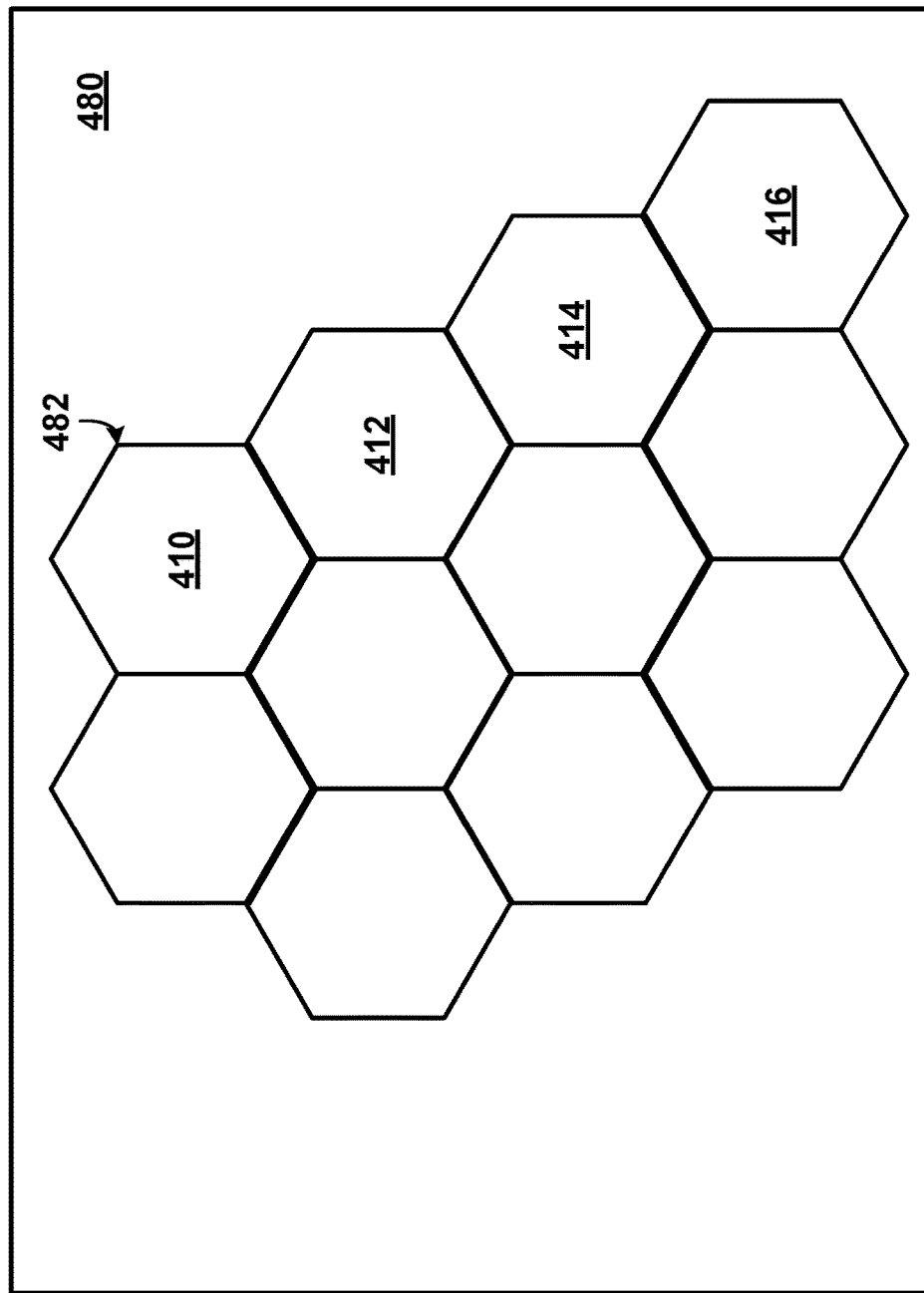
FIG. 4D illustrates a fourth cross-section view of the system of FIG. 4A.

FIG. 4D illustrates a fourth cross section view of system 400, in which the z-axis is also pointing out of the page. As shown in FIG. 4D, system 400 also includes a support structure 480 that mounts a plurality of receivers, exemplified by receivers 410, 412, 414, and 416, each of which may be similar to any of light detectors 210 and/or 310. Further, as shown, system 400 also includes one or more light shields 482.

Each of receivers 410, 412, 414, 416, 418, etc., may include one or more light detectors. Additionally, each receiver may be arranged to intercept focused light transmitted through a respective aperture of opaque material 420 (shown in FIG. 4C). For example, receivers 410, 412, 414, 416 may be arranged to intercept focused light that is transmitted, respectively, through apertures 420a, 420b, 420c, 420d (shown in FIG. 4C). In one embodiment, receivers 410, 412, 414, 416 may be positioned to overlap (e.g., in the direction of the z-axis), respectively, output mirrors 470, 472, 474, 476.

Support Structure 480 may include a solid structure that has material characteristics suitable for supporting receivers 410, 412, 414, 416, etc. In one example, support structure 480 may include a printed circuit board (PCB) to which the light detectors of receivers 410, 412, 414, 416, 418, etc., are mounted.

Light shield(s) 482 may comprise one or more light absorbing materials (e.g., black carbon, black chrome, black plastic, etc.) arranged around receivers 410, 412, 414, 416, etc. In some examples, light shield(s) 482 may prevent (or reduce) light from external sources (e.g., ambient light, etc.) from reaching receivers 410, 412, 414, 416, etc. Alternatively or additionally, in some examples, light shield(s) 482 may prevent or reduce cross-talk between receive channels associated with receivers 410, 412, 414, 416, etc. Thus, light shield(s) 482 may also be configured to optically separate receivers 410, 412, 414, 416, etc., from one another.

Returning now to FIG. 4C, as noted above, opaque material 420 defines a grid of apertures 410, 412, 414, 416, etc. Thus, in some examples where system 400 is included in a LIDAR device, each aperture in opaque material 420 may transmit light toward a respective portion of a field-of-view (FOV) of the LIDAR and also receive reflected portions of the transmitted light returning from that same respective portion of the FOV. Thus, each aperture may be associated with a transmit/receive channel of the LIDAR. In one embodiment, opaque material 420 may comprise four rows of 64 apertures, where each row of horizontally (e.g., along y-axis) adjacent apertures is separated by a vertical offset (e.g., along z-axis) from another row of apertures. In this embodiment, system 400 could thus provide 4*64=256 co-aligned transmit/receive channels. In other embodiments, system 400 may include a different number of transmit/receive channels (and thus a different number of associated apertures).

Additionally, the LIDAR in this example may have a plurality of light emitters, each of which is assigned to one or more transmit/receive channels. Referring back to FIG. 4A for instance, light emitter 440 transmits light portions 404a and 404b for scanning the transmit/receive channels associated with apertures 420a and 420c (shown in FIG. 4C); and light emitter 442 transmits light portions 406a and 406b for scanning the channels associated with apertures 420b and 420d.

In line with the discussion above, an example LIDAR device that employs system 400 may be configured to transmit a plurality of light beams 404a, 406a, 404b, 406b, etc., in a relative spatial arrangement toward a scene (e.g., the spatial arrangement of apertures 420a, 420b, 420c, 420d, etc., shown in FIG. 4C). Each of the transmitted light beams may correspond to a portion of (or all) the light emitted by a particular light emitter. For example, as best shown in FIG. 4A, a first portion 404a of light 404 (emitted from light emitter 404) can be directed in a combined optical path defined by waveguides 450 and 451 toward a first transmit location (shaded region 404a shown in FIG. 4B) of a first light beam in the relative spatial arrangement, and a second portion 404b of light 404 can be directed toward a second transmit location (shaded region 404b shown in FIG. 4B) of a second light beam in the relative spatial arrangement. In this way, a single light emitter 440 can be used to drive two separate channels (e.g., the channels scanned via apertures 420a and 420c shown in FIG. 4C) of the LIDAR that are relatively more distant from one another (e.g., as compared to the adjacent channels associated with apertures 420a and 420b). For instance, with this arrangement, a multi-channel LIDAR device of system 400 can mitigate scanning errors (e.g., crosstalk errors between multiple channels illuminated using a single emitter, retroreflector errors associated with returning reflections from retroreflectors in the scene, etc.) by spatially separating the channels illuminated using the single emitter.

As noted above, one example LIDAR device herein may use system 400 to transmit a plurality of light beams in a relative spatial arrangement. To that end, for example, the LIDAR device may include a first waveguide (e.g., 453) configured to receive a first portion (e.g., 406a) of a first light signal (e.g., 406) emitted by a first light emitter (e.g., 442) and transmit the first light portion out of the first waveguide at a first transmit location (e.g., output of waveguide 453) of a first light beam in the relative spatial arrangement of light beams; and a second waveguide (e.g., 457) configured to receive a second portion (e.g., 406*b*) of the same light signal (e.g., 406) and transmit the second light portion out of the second waveguide at a second transmit location (e.g., output of waveguide 457) as a second light beam in the relative spatial arrangement. The example LIDAR device may also include a third waveguide (e.g., 451) configured to receive a second light signal (e.g., 404*a*) emitted from a second light emitter (e.g., 440) and transmit the second light signal out of the third waveguide at a third transmit location (e.g., output of waveguide 451) as a third light beam of the plurality of light beams in the relative spatial arrangement.

In this example, as best shown in FIG. 4B, the first transmit location of light beam 406*a* may be at a first distance to the second transmit location of light beam 406*b*; and the third transmit location of light beam 404*a* may be at a second distance to the first transmit location different than the first distance. For example, as best shown in FIG. 4B, the first distance (between beams 406*a* and 406*b*) may be greater than the second distance (between beams 404*a* and 406*a*).

In some examples, the plurality of light beams (e.g., 404*a*, 406*a*, 404*b*, 406*b*, etc.) may be diverging light beams that diverge away from the LIDAR device of system 400. In these examples, the diverging light beams could thus intersect at a given distance from the LIDAR device. As best shown in FIG. 4B for example, light beams 404*a* and 406*a* may initially exit the LIDAR of system 400 as separate light beams that diverge away from the LIDAR and eventually intersect one another at the given distance from the LIDAR.

In some examples, one or more of waveguides 450, 451, 452, 453, 454, 455, 456, and/or 457 (and/or portions thereof) can be alternatively configured similarly to any of the waveguides described in systems 100 and/or 300. In a first example, waveguide 463 (shown in FIG. 4B), or a portion thereof, can be alternatively shaped similarly to waveguide 152 and/or 154 (as best shown in FIG. 1C) to route light signal 406*a* through any of apertures 420*a*, 420*b*, 420*c*, 420*d*, etc., in an efficient manner (e.g., efficient use of space on a substrate, and/or reduced signal leakage between adjacent sections of the waveguide that extend lengthwise in different directions, etc.). In a second example, waveguide 452 (shown in FIG. 4A), or a portion thereof, could be alternatively shaped and/or configured similarly to waveguide 154 (shown in FIG. 1C), or a portion thereof. In the second example, system 400 could also optionally include a mirror (e.g., similar to mirror 164) disposed on a middle section of waveguide 452 similarly to mirror 164. Other examples are possible.

Thus, in some examples, a multi-layer optical system arrangement such as the arrangements described for systems 100 and 400 can be employed in a LIDAR device (or other device that operates based on optical signals) to route light signals from multiple light emitter to multiple spatially separate transmit/channels via non-parallel optical paths (e.g., the optical paths of light portions 406*a* and 404*b*) and in a space-efficient manner.

It is noted that the sizes, shapes, and positions shown in FIGS. 4A-4D for the various components of system 400 are not necessarily to scale but are illustrated as shown only for convenience in description.

III. EXAMPLE METHODS

Figure 5:
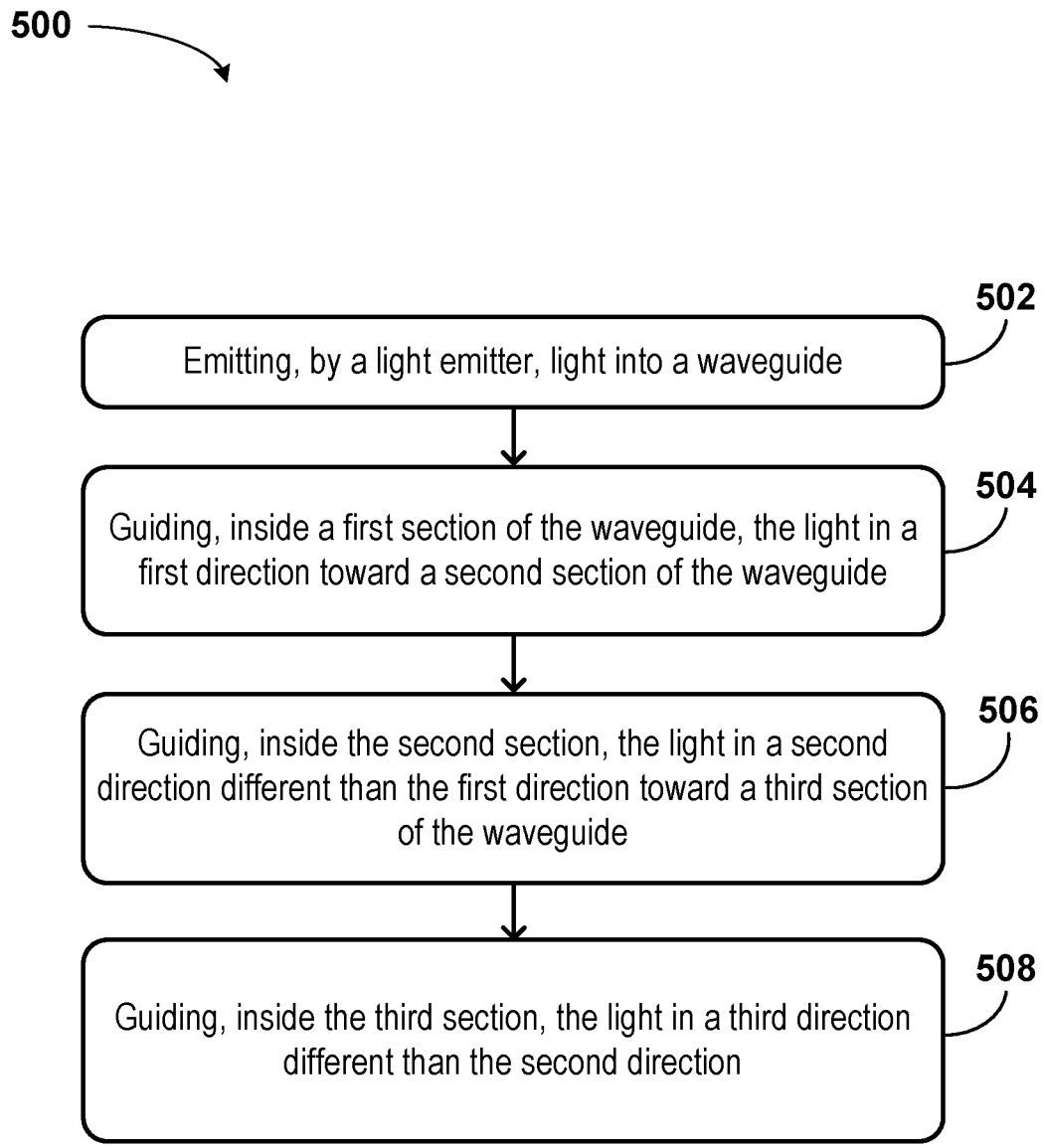
FIG. 5 is a flowchart of a method, according to example embodiments.

FIG. 5 is a flowchart of a method 500, according to example embodiments.

Method 700 presents an embodiment of a method that could be used with systems 100, 290, 300, 400, and/or device 200, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 500 and other processes and methods disclosed herein, each block in FIG. 5 may represent circuitry that is wired to perform the specific logical functions in the process.

At block 502, method 500 involves emitting, by a light emitter (e.g., emitter 142), light (e.g., light 106*b*) into a waveguide (e.g., waveguide 152).

At block 504, method 500 involves guiding, inside a first section (e.g., section 152P) of the waveguide, the light in a first direction (e.g., parallel to x-axis in FIG. 1C) toward a second section (e.g., section 152Q) of the waveguide.

At block 506, method 500 involves guiding, inside the second section, the light in a second direction (e.g., parallel to the y-axis in FIG. 1C) different than the first direction toward a third section (e.g., section 152R) of the waveguide.

At block 508, method 500 involves guiding, inside the third section, the light in a third direction (e.g., parallel to the x-axis in FIG. 1C) different than the second direction.

IV. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A light detection and ranging (LIDAR) device comprising:
   a substrate;
   a waveguide disposed on the substrate, wherein a first section of the waveguide extends lengthwise on the substrate in a first direction, wherein a second section of the waveguide extends lengthwise on the substrate in a second direction different than the first direction, wherein a third section of the waveguide extends lengthwise on the substrate in a third direction different than the second direction, and wherein the second section extends lengthwise between the first section and the third section;
   a light emitter configured to emit light; and
   an optical element configured to direct at least a portion of the light emitted by the light emitter into the waveguide at an angle-of-entry such that the waveguide guides the light inside the first section toward the second section, inside the second section toward the third section, and inside the third section away from the second section.

2. The LIDAR device of claim 1, wherein the first direction of the first section is parallel to the third direction of the third section.

3. The LIDAR device of claim 1, wherein the waveguide has an input end and an output end opposite the input end, wherein the first section extends between the input end and the second section, wherein the third section extends between the second section and the output end, wherein the waveguide has a first wall that extends from the input end to the output end and a second wall opposite the first wall, and wherein the waveguide is configured to receive the light at the input end and to transmit the light out of the waveguide at the output end.

4. The LIDAR device of claim 3, wherein the first wall includes a flat edge in the second section of the waveguide, and wherein the second wall includes a curved edge in the second section of the waveguide.

5. The LIDAR device of claim 4, further comprising:
   a mirror disposed on the flat edge, wherein the mirror is configured to reflect at least a portion of the light transmitted out of the flat edge back into the waveguide and toward the curved edge of the second wall.

6. The LIDAR device of claim 3, wherein the first wall includes an edge between the first section and the second section of the waveguide, and wherein a first angle between the first section and the edge at the first wall is different than a second angle between the first section and the second section at the second wall.

7. The LIDAR device of claim 6, wherein the first angle is greater than the second angle.

8. The LIDAR device of claim 6, wherein the edge is a flat edge and the first angle is a tilting angle of the flat edge, and wherein the tilting angle of the flat edge is associated with one or more optical characteristics of the light emitted by the light emitter.

9. The LIDAR of claim 8, wherein the one or more optical characteristics include one or more wavelengths of the light.

10. The LIDAR of claim 8, wherein the one or more optical characteristics include the angle-of-entry.

11. The LIDAR of claim 1, wherein the angle-of-entry is between 0 degrees and 6 degrees.

12. The LIDAR device of claim 3, wherein the first section of the waveguide is tapered such that a cross-sectional size of the first section at the input end is less than the cross-sectional size of the first section at a given distance to the input end.

13. The LIDAR device of claim 3, wherein the third section of the waveguide is tapered such that a cross-sectional size of the third section at the output end is less than the cross-sectional size of the third section at a given distance to the output end.

14. The LIDAR device of claim 1, wherein the optical element comprises a cylindrical lens.

15. The LIDAR device of claim 14, wherein the cylindrical lens comprises an optical fiber.

16. The LIDAR device of claim 1, wherein the optical element is configured to at least partially collimate the light emitted by the light emitter.

17. The LIDAR device of claim 1, wherein the waveguide is a first waveguide, further comprising a second waveguide disposed on the substrate, wherein the optical element is further configured to direct a portion of the light emitted by the light emitter into the second waveguide.

18. The LIDAR device of claim 1, wherein the light emitter is disposed on the substrate.

19. The LIDAR device of claim 1, wherein the optical element is disposed on the substrate.

20. The LIDAR device of 1, wherein the first section of the waveguide has a first cross-sectional size, wherein the third section of the waveguide has a third cross-sectional size, and wherein the third cross-sectional size is less than the first cross-sectional size.

21. The LIDAR device of claim 4, wherein the curved edge defines a concave-shaped surface inside the waveguide, and wherein the concave-shaped surface is configured to focus light into the third section of the waveguide.

22. The LIDAR device of claim 3, wherein the input end includes a curved surface.

23. The LIDAR device of claim 3, wherein the first wall includes a first tilted edge between the first section and the second section, and wherein the second wall includes a second tilted edge between the second section and the third section.

* * * * *